United States Patent
Boucard et al.

(10) Patent No.: US 12,332,811 B1
(45) Date of Patent: Jun. 17, 2025

(54) METHOD AND APPARATUS FOR EXCLUSIVE ACCESS FAIRNESS IN MEMORY SYSTEMS WITH DISTRIBUTED EXCLUSIVE ACCESS MANAGEMENT

(71) Applicant: QUALCOMM Incorporated, San Diego, CA (US)

(72) Inventors: Philippe Boucard, Le Chesnay (FR); Ameline Le Rouzic, Versailles (FR); Nordine Chaibelaine, Rungis (FR); Olivier Loison, Sevres (FR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/610,087

(22) Filed: Mar. 19, 2024

(51) Int. Cl.
*G06F 12/00* (2006.01)
*G06F 12/0831* (2016.01)
*G06F 13/16* (2006.01)

(52) U.S. Cl.
CPC ...... *G06F 13/1663* (2013.01); *G06F 12/0831* (2013.01); *G06F 13/1689* (2013.01)

(58) Field of Classification Search
CPC .......... G06F 12/0831; G06F 13/1689
See application file for complete search history.

(56) References Cited

U.S. PATENT DOCUMENTS

| 2013/0151799 A1* | 6/2013 | Panavich | G06F 13/1621 711/E12.001 |
| 2015/0312165 A1* | 10/2015 | Nemeth | H04L 47/722 709/213 |

* cited by examiner

Primary Examiner — Arvind Talukdar
(74) Attorney, Agent, or Firm — NORTON ROSE FULBRIGHT US LLP/Qualcomm

(57) ABSTRACT

This disclosure provides systems, methods, and devices for memory systems that support enhanced exclusive access fairness operations for scalable exclusive monitor architectures. In a first aspect, device includes a processing system that includes one or more shared memory devices and one or more request nodes. The processing system also includes one or more network interface units (NIUs), each NIU including an exclusive monitor configured to monitor exclusive accesses to shared memory addresses for a corresponding request node and including a timeout register for the exclusive monitor configured to control exclusive access fairness. The processing system includes one or more home nodes coupled to a corresponding shared memory device of the one or more shared memory devices. The processing system further includes an interconnect configured to couple the one or more request nodes to the one or more shared memory devices. Other aspects and features are also claimed and described.

20 Claims, 14 Drawing Sheets

METHOD AND APPARATUS FOR EXCLUSIVE ACCESS FAIRNESS IN MEMORY SYSTEMS WITH DISTRIBUTED EXCLUSIVE ACCESS MANAGEMENT

TECHNICAL FIELD

Aspects of the present disclosure relate generally to system-on-a-chip (SoC) architecture, and more particularly, to memory systems for storing data. Some features may enable an enhanced exclusive access fairness scheme for scalable exclusive monitor architectures and provide improved memory capabilities for enhanced exclusive read and write operations.

INTRODUCTION

A computing device (e.g., a laptop, a mobile phone, etc.) may include one or several processors to perform various computing functions, such as telephony, wireless data access, and camera/video function, etc. A memory system is an important component of the computing device. The processors may be coupled to the memory system to perform the aforementioned computing functions. For example, the processors may fetch instructions from the memory system to perform the computing functions and/or to store within the memory system temporary data involved in performing these computing functions.

Memory systems may make use of memory cells that are volatile in nature. Volatile memory cells retain information for short periods of time, such as fractions of a second. A refresh operation may be performed with volatile memory cells to maintain the information for longer periods of time. In an example volatile memory cell storing information as an electrical charge, the electrical charge decays over a fraction of a second. Before the charge decays beyond the point of lost information, the memory cell may be refreshed to extend the period of time that the memory cell retains the information. In some cases, the refresh may be repeatedly performed to extend the period of storage of the information indefinitely, or as long as electricity is supplied to the circuit. This refresh operation consumes power, which impacts the operation of devices operating from limited power sources, such as with mobile devices operating from battery power.

System-on-a-chip (SoC) architecture may include a memory system with multiple shared memory devices that are shared by a plurality of CPUs, such as cores, chips, or dies thereof. In such as distributed SoC architecture, multiple CPUs may try to access the same shared data. SoCs utilize exclusive data access monitors to track the exclusive data access to the shared memory. As SoC system grow, such as by increased DDR memory channels and/or increased CPUs, the amount of exclusive monitors used to track exclusive access to the data grows exponentially and represents a large and increased portion of larger and/or more advanced SoCs. Also, ensuring exclusive access fairness for requesting devices across the exclusive monitors creates additional challenges.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect, a device includes a processing system including: one or more shared memory devices, each shared memory device of the one or more shared memory devices includes a plurality of shared memory addresses; one or more request nodes, each request node corresponding to a processor of the processing system; one or more network interface units (NIUs), each NIU of the one or more NIUs including an exclusive monitor configured to monitor exclusive accesses to the plurality of shared memory addresses for a corresponding request node of the one or more request nodes and including a timeout register for the exclusive monitor configured to control exclusive access fairness; one or more home nodes, each home node of the one or more home nodes coupled to a corresponding shared memory device of the one or more shared memory devices; and an interconnect coupled to each NIU of the one or more NIUs and to each home node of the one or more home nodes and configured to couple the one or more request nodes to the one or more shared memory devices.

In an additional aspect, a method for exclusive access management includes: receiving, by a request node, a read data complete message including data associated with an exclusive read request for a particular memory address of a shared memory device and indicating the particular memory address has been read; arming, by the request node, an exclusive monitor based on the read data complete message; starting, by the request node, a timeout timer for the exclusive monitor responsive to arming the exclusive monitor; and sending, by the request node prior to expiration of the timeout timer, an exclusive write request for the particular memory address to a home node associated with the shared memory device, wherein success of the exclusive write request for the particular memory address is guaranteed based on the exclusive write request being sent prior to expiration of the timeout timer.

In an additional aspect, a method for exclusive access management includes: sending, from a request node, an exclusive read request for a particular memory address to a home node associated with a shared memory device; reading, by the home node, data associated with the particular memory address from the shared memory device; sending, by the home node, a read data complete message including the data associated with the particular memory address; arming, by the request node, an exclusive monitor based on the read data complete message; starting, by the request node, a timeout timer for the exclusive monitor responsive to arming the exclusive monitor; sending, from the request node, a read completion acknowledgement to the home node; sending, from the request node, an exclusive write request for the particular memory address to the home node; receiving, by the request node, a snoop query message for the particular memory address from the home node responsive to the exclusive write request for the particular memory address; sending, by the request node, a snoop query response message for the particular memory address to the home node indicating a hit; writing, by the home node, data to the particular memory address from the shared memory device responsive to the snoop query response message indicating the hit; receiving, by the request node, a snoop clean message for the particular memory address from the home node responsive to the snoop query response message indicating the hit; clearing, by the request node, the exclusive monitor based on the snoop clean message for the particular memory address; and sending, by the home node, a write completion message for the particular memory address to the request node responsive to receiving snoop clean responses from each of the request nodes.

In an additional aspect, a method for exclusive access management includes: arming, by a request node, an exclusive monitor based on a read data complete message for a particular memory address associated with a shared memory device, the read data complete message received from a home node and responsive to an exclusive read request for the particular memory address from the request node; starting, by the request node, a timeout timer for the exclusive monitor responsive to arming the exclusive monitor; and clearing, by the request node, the exclusive monitor and the timeout timer based on a snoop clean message for the particular memory address received from the home node, the snoop clean message associated with an exclusive write request for the particular memory address from the request node.

In an additional aspect of the disclosure, an apparatus, such as a wireless device, includes at least one processor and a memory coupled to the at least one processor. The at least one processor is configured to communicate with the memory system through a memory controller coupled to a channel that couples the processor to the memory system. The processor may be a processor, controller, or other logic circuitry in a host.

In an additional aspect of the disclosure, a non-transitory computer-readable medium stores instructions that, when executed by a processor, cause the processor to perform operations described herein regarding aspects of the disclosure.

Memory systems in the present disclosure may be embedded within a processor on a semiconductor die or be part of a different semiconductor die. The memory systems may be of various kinds. For example, the memory may be static random access memory (SRAM), dynamic random access memory (DRAM), magnetic random access memory (MRAM), NAND flash, or NOR flash, etc.

Methods and apparatuses are presented in the present disclosure by way of non-limiting examples of Low-Power Double Data Rate (LPDDR) Synchronous Dynamic Random Access Memory (SDRAM). For example, the LPDDR memory operating in accordance with LPDDR specification promulgated by Joint Electronic Device Engineering Council (JEDEC). One such LPDDR specification may be LPDDR5. Another such LPDDR specification may be LPDDR6.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections. The processor may be coupled to the first network adaptor and a memory for storing data to support the processing and communications operations performed by the processor. The network adaptor may support communication over a wireless communications network such as a 5G NR communication network. The processor may cause the transmission of data stored in memory over the wireless communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
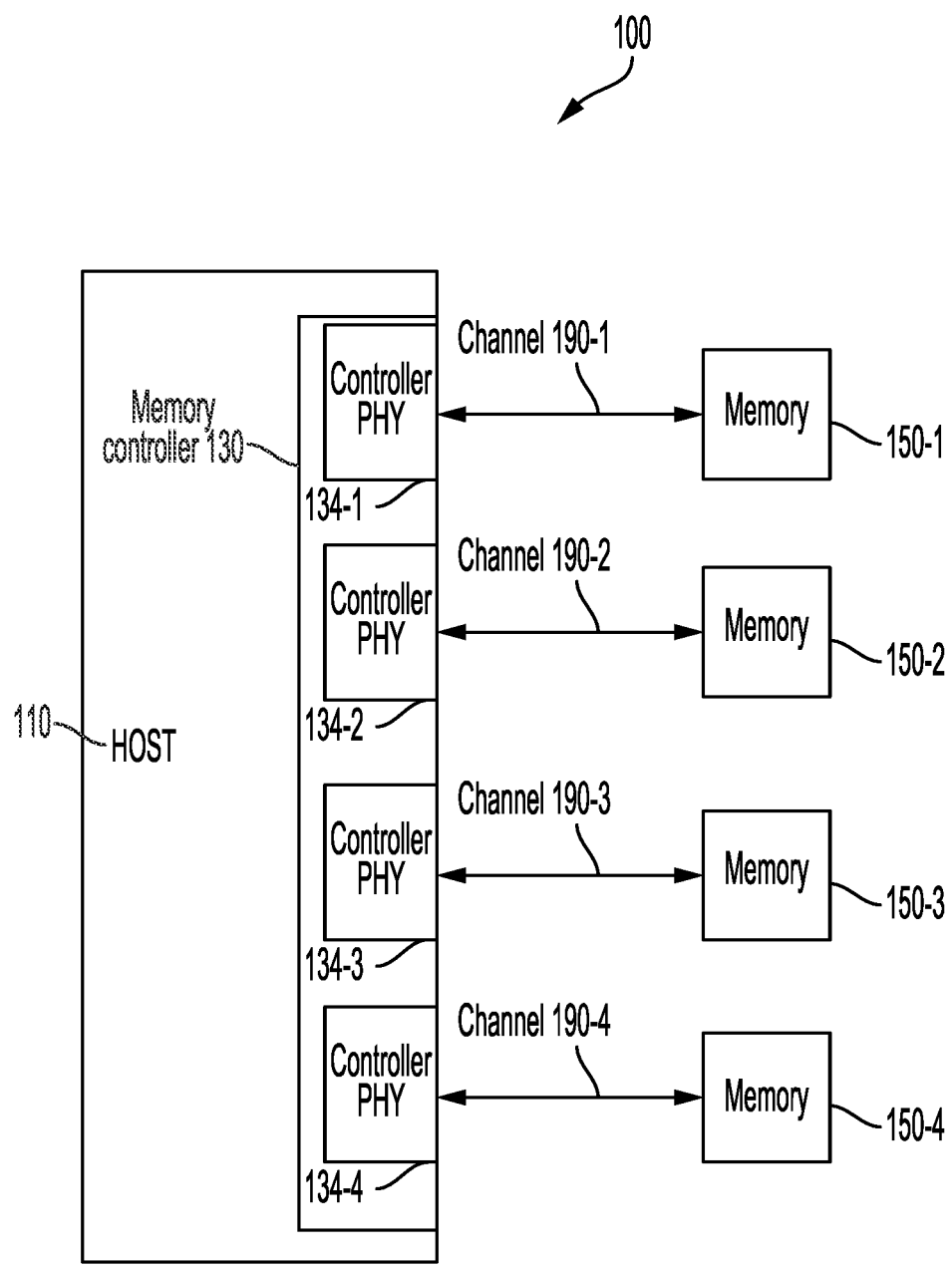
FIG. 1 shows a block diagram of an example computing system incorporating a host, memory system, and channels coupling the host and the memory system according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support data processing, including designs and techniques for utilizing exclusive monitors on a request node (RN) side of an interconnect and upstream from a home node (HN) associated with a shared memory device. Aspects described herein also include support for enhanced exclusive access fairness operations, including utilizing a timeout register to create a timeout delay for exclusive access reads. A RN that successfully complete an exclusive access read operation may be given a time period to complete a corresponding exclusive access write operation in which success of the corresponding exclusive access write operation is guaranteed to ensure fairness across RNs and that fast/low latency RNs and/or RNs with internal caches do not monopolize exclusive access and prevent slower RNs and/or RNs without cache memories from being able to gain access. In some such aspects, the enhanced exclusive access fairness operations include utilizing snoop messages or other coherency mechanisms at a HN to receive status information on the exclusive monitors and timeout registers on a RN side of a RN-to-memory interconnect. The HN node may then store intervening or concurrent exclusive access commands at the HN until expiration of the timeout timer represented by the timeout register.

Particular implementations of the subject matter described in this disclosure may be implemented to realize one or more of the following potential advantages or benefits. In some aspects, the present disclosure provides a scalable solution for providing exclusive access management to shared data. Moving the EMs to the NIUs provides more space savings and reduction of EMs the more DDR channels and CPUs there are. The solution is also backwards compatible with current exclusive data commands, and leverage existing snoop or data coherency commands and mechanisms to enable HNs to still manage exclusive access to shared memory. Additionally, there is no timing impact for scaling and the area for scaling increases linearly, rather than exponentially. Furthermore, the scalable architecture of the EMs in the NIUs provides compatibility and support for a wide range of SoC architectures.

In some aspects, the present disclosure provides enhanced exclusive access fairness operations for RNs in the scalable or distributed EM architecture. For example, the timer based exclusive access fairness operations can guarantee fair access to slower RNs and not always let a race dictate who get exclusive access and may not be impacted by spurious exclusive access commands (e.g., a write exclusive command not connected to a read exclusive command). Additionally, the timer based exclusive access fairness operations with queueing commands at the HN can reduce the amount of fail responses by delaying intervening or concurrent commands until the timeout timer expires instead of failing them upon receipt. This also may reduce bandwidth and cycles for redundant commands.

An example memory device that may incorporate aspects of this disclosure, including exclusive monitors located on a RN side of a RN-to-memory interconnect, is shown in FIG. 1. FIG. 1 illustrates an apparatus 100 incorporating a host 110, memories 150, and channels 190 coupling the host 110 and the memories 150. The apparatus 100 may be, for example, a device among computing systems (e.g., servers, datacenters, desktop computers), mobile computing device (e.g., laptops, cell phones, vehicles, etc.), Internet of Things devices, virtual reality (VR) systems, augmented reality (AR) systems, automobile systems (e.g., driver assistance systems, autonomous driving systems), image capture devices (e.g., stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities), and/or multimedia systems (e.g., televisions, disc players, streaming devices).

The host 110 may include at least one processor, such as central processing unit (CPU), graphic processing unit (GPU), digital signal processor (DSP), multimedia engine, and/or neural processing unit (NPU). The host 110 may be configured to couple and to communicate to the memories 150 (e.g., memories 150-1 to 150-4), via channels 190 (e.g., channels 190-1 to 190-4), in performing the computing functions, such as one of data processing, data communication, graphic display, camera, AR or VR rendering, image processing, neural processing, etc. For example, the memories 150-1 to 150-4 may store instructions or data for the host to perform the computing functions.

The host 110 may include a memory controller 130, which may include controller PHY modules 134-1 to 134-4. Each of the controller PHY modules 134-1 to 134-4 may be coupled to a respective one of the memories 150-1 to 150-4 via respective channels 190-1 to 190-4. For ease of reference, read and write are referenced from a perspective of the host 110. For example, in a read operation, the host 110 may receive via one or more of the channels 190-1-190-4 data stored from one or more of the memories 150-1 to 150-4. In a write operation, the host 110 may provide via one or more of the channels 190-1-190-4 data to be written into one or more of the memories 150-1-150-4 for storage. The memory controller 130 may be configured to control various aspects, such as logic layers, of communications to and from the memories 150-1-150-4. The controller PHY modules 134-1-134-4 may be configured to control electrical characteristics (e.g., voltage levels, phase, delays, frequencies, etc.) of signals provided or received on the channels 190-1-190-4, respectively.

In some examples, the memories 150-1-150-4 may be LPDDR DRAM (e.g., LPDDR5, LPDDR6). In some examples, the memories 150-1-150-4 may be different kinds of memory, such as one LPDDR5, one LPDDR6, one Flash memory, and one SRAM, respectively. The host 110, the memories 150-1-150-4, and/or the channels 190-1-190-4 may operate according to an LPDDR (e.g., LPDDR5, LPDDR6) specification. In some examples, each of the channels 190-1-190-4 may include 16 bits of data (e.g., 16 DQs). In some examples, each of the channels 190-1-190-4 may operate on 32 bits of data (e.g., 32 DQs). In FIG. 1, four channels are shown, however the apparatus 100 may include more or less channels, such as 8 or 16 channels.

Figure 2:
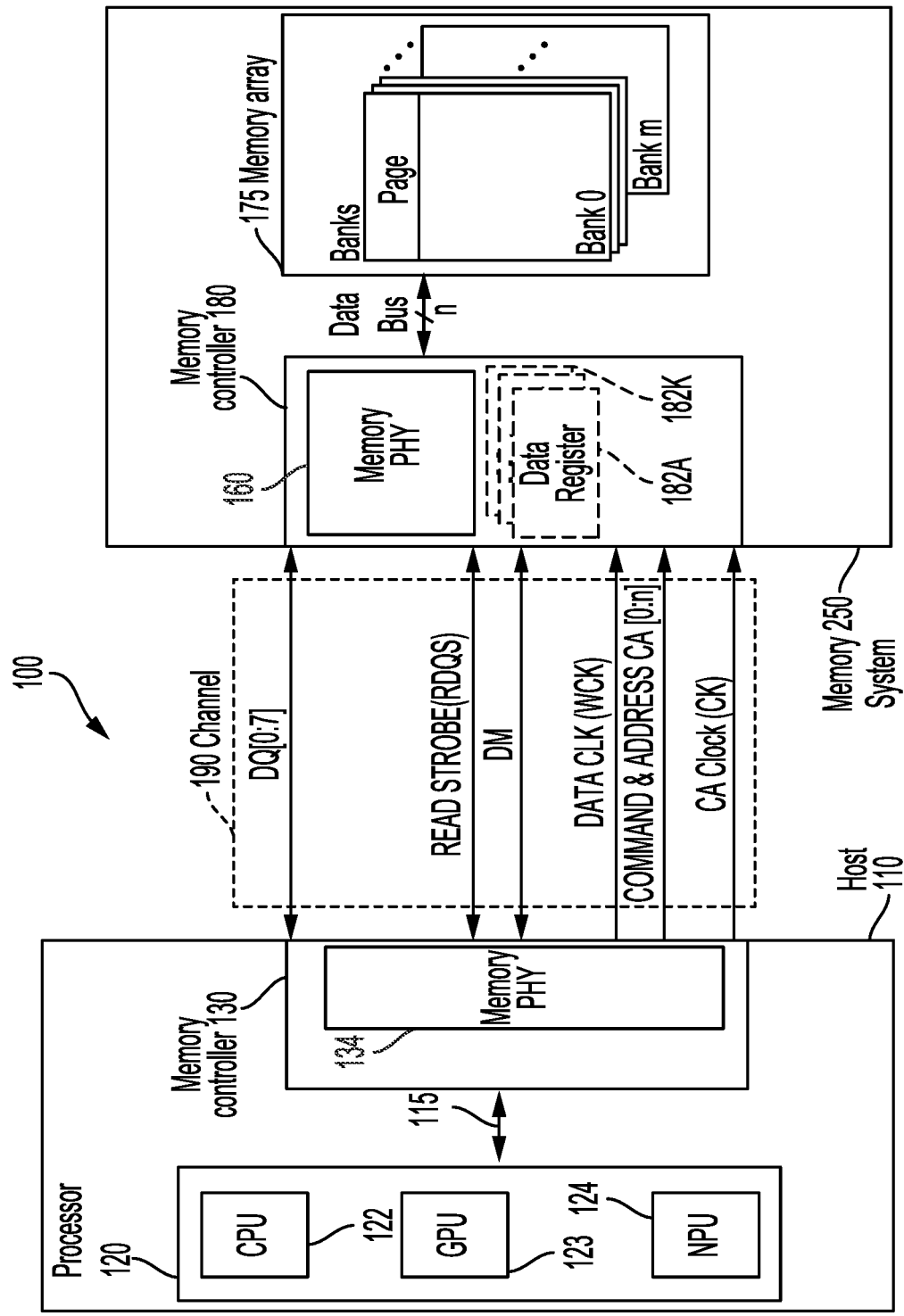
FIG. 2 shows a block diagram of an example computing system incorporating a host, memory system, and channels coupling the host and the memory system with another implementation of the channels according to one or more aspects of the disclosure.

Additional details of an aspect of the embodiment of the apparatus 100 for providing access to a memory system (such as one of memories 150-1-150-4 including logic and control circuit) are shown in FIG. 2. FIG. 2 illustrates a configuration of the host 110, a memory system 250, and the channel 190 of FIG. 1. The channel 190 between host 110 and the memory system 250 may include a plurality of connections, some of which carry data (e.g., user data or application data) and some of which carry non-data (e.g., addresses and other signaling information). For example, non-data connections in channel 190 may include a data clock (e.g., WCK) used in providing data to the respective memory system 250 and a read data strobe (e.g., RDQS) used in receiving data from the respective memory system 250, on a per byte basis. The channel 190 may further include a data mask (e.g., DM, sometimes referred to as data mask inversion DMI to indicate multiple functions performed by the signal connection) signaling used to mask certain part of data in a write operation. The channel 190 may further include command and address (e.g., CA[0:n]) and associated CA clock to provide commands (e.g., read or write commands) to the memory system 250.

The host 110 may include at least one processor 120, which may include a CPU 122, a GPU 123, and/or an NPU 124. The host 110 may further include a memory controller 130 having a controller PHY module 134. The memory controller 130 may couple to the at least one processor 120 via a bus system 115 in performing the various computing functions. The term "bus system" may provide that elements coupled to the "bus system" may exchange information therebetween, directly or indirectly. In different embodiments, the "bus system" may encompass multiple physical connections as well as intervening stages such as buffers, latches, registers, etc. A module may be implemented in hardware, software, or a combination of hardware and software.

The memory controller 130 may send and/or receive blocks of data to other modules, such as the at least one processor 120 and/or the memory system 250. The memory system 250 may include a memory controller 180 with a memory I/O module 160 (e.g., a PHY layer) configured to control electrical characteristics (e.g., voltage levels, phase, delays, frequencies, etc.) to provide or to receive signals on connections of the channel 190. For example, memory I/O module 160 may be configured to capture (e.g., to sample) data, commands, and addresses from the host 110 via the channel 190 and to output data to the host 110 via the channel 190. Example techniques for communicating on the channel 190 between the memory I/O module 160 and the memory controller 130 are shown in the examples of FIG. 3A, FIG. 3B, FIG. 4A, and FIG. 4B. The memory controller 180 may also include data registers 182A-K configured to store data in transit between the host 110 and the memory array 175 and/or to store configuration settings or other data.

The memory system 250 may further include a memory array 175, which may include multiple memory cells (e.g., DRAM memory cells, MRAM memory cells, SRAM memory cells, Flash memory cells) that store values. The host 110 may read data stored in the memory array 175 and write data into the memory array 175, via the channel 190 and the memory I/O module 160. The memory array 175 may be divided into a plurality of banks with each bank organized as a plurality of pages.

Application or user data may be processed by the processor 120 and the memory controller 130 instructed to store and/or retrieve such data from the memory system 250. For example, data may be generated during the execution of an application, such as a spreadsheet program that computes values based on other data. As another example, data may be generated during the execution of an application by receiving user input to, for example, a spreadsheet program. As a further example, data may be generated during the execution of a gaming application, which generates information regarding a representation of a scene rendered by a three-dimensional (3-D) application.

The host 110 is coupled to the memory system 250 via the channel 190, which is illustrated for a byte of data, DQ[0:7]. The channel 190 and signaling between the host 110 and the memory system 250 may be implemented in accordance with the JEDEC DRAM specification (e.g., LPDDR5, LPDDR6). As illustrated, the channel 190 includes signal connections of the DQs, a read data strobe (RDQS), a data mask (DM), a data clock (WCK), command and address (CA[0:n]), and command and address clock (CK). The host 110 may use the read data strobe RDQS to strobe (e.g., to clock) data in a read operation to receive the data on the DQs. The memory system 250 may use the data mask DM to mask certain parts of the data from being written in a write operation. The memory system 250 may use the data clock WCK to sample data on the DQs for a write operation. The memory system 250 may use the command and address clock CK to clock (e.g., to receive) the CAs. A signal connection for each of the signaling may include a pin at the host 110, a pin at the memory system 250, and a conductive trace or traces electrically connecting the pins. The conductive trace or traces may be part of a single integrated circuit (IC) on a silicon chip containing the processor 120 and the memory system 250, may be part of a package on package (PoP) containing the processor 120 and the memory system 250, or may be part of a printed circuit board (PCB) coupled to both the processor 120 and the memory system 250.

The memory system 250 may include a memory I/O module 160 (e.g., a PHY layer) configured to control electrical characteristics (e.g., voltage levels, phase, delays, frequencies, etc.) to provide or to receive signals on the channel 190. For example, memory I/O module 160 may be configured to capture (e.g., to sample) data, commands, and addresses from the host 110 via the channel 190 and to output data to the host 110 via the channel 190. Information transmitted across the channel 190 may be stored in registers in the memory I/O module 160 of the memory system 250 as a temporary or short-term storage location prior to longer-term storage in the memory array 175.

The memory system 250 may further include a memory array 175, which may include multiple memory cells (e.g., DRAM memory cells) that store information. The host 110 may read data stored in the memory array 175 and write data into the memory array 175 via the channel 190. Moreover, the memory array 175 may be configured to store metadata such as ECCs (e.g., system or array ECCs) associated with the stored data.

Operations according to some embodiments of this disclosure for storing and retrieving information from memory array 175 may be performed by controlling signals on individual lines of the channel 190. Example embodiments of signaling for a write operation are shown and described with reference to FIG. 3A and FIG. 3B. Example embodiments of signaling for a read operation are shown and described with reference to FIG. 4A and FIG. 4B.

Figure 3A:
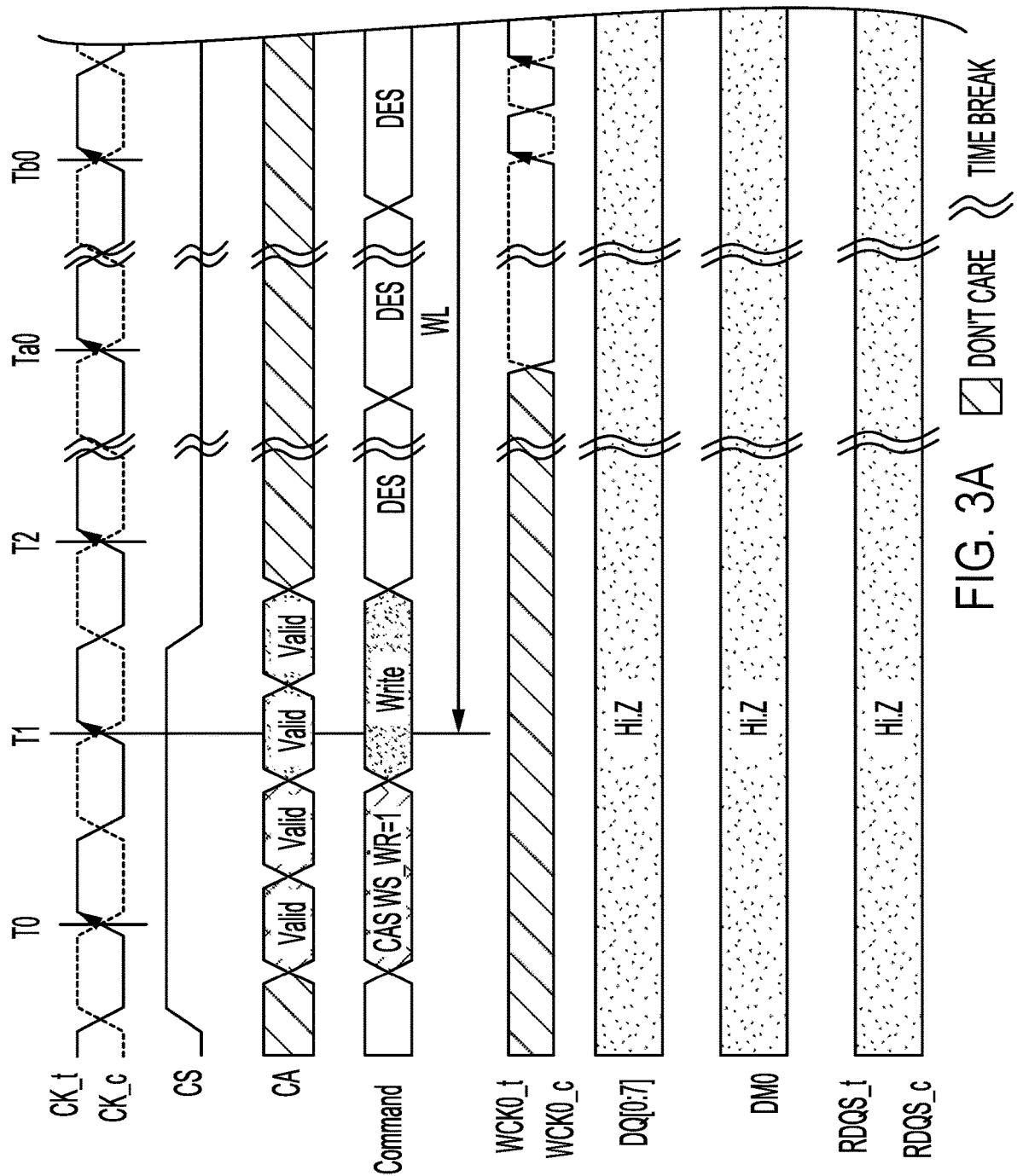
FIG. 3A and FIG. 3B illustrate waveforms of transfer of data through an example channel in a write operation in accordance with certain aspects of the present disclosure.
Figure 3B:
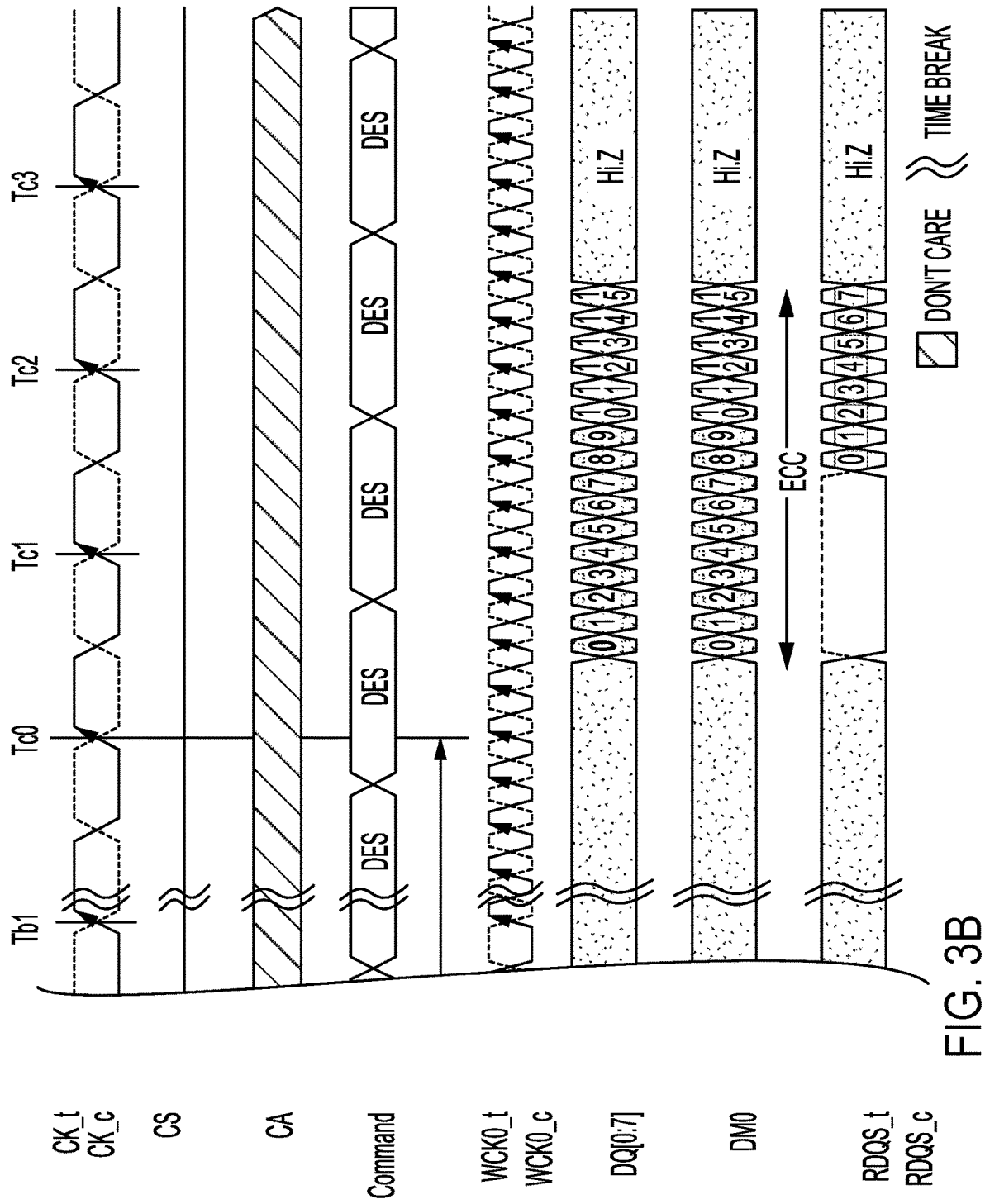

FIG. 3A and FIG. 3B illustrate waveforms for transfer of data through an example channel in a write operation in accordance with certain aspects of the present disclosure.

The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_t and falling edge of CK_c), a CAS command may be provided by the host 110 for a write operation to the memory system 250. At T1, a write command may be provided by the host 110 to the memory system 250.

After a time period write latency (WL), the host 110 may toggle the data clock WCK0_t and WCK0_c to provide the memory system 250 with clocking for receiving data for write, on the DQ signal connections. At Tc0-Tc2, the memory system 250 may receive 16 bytes of data serially, on each of the DQ[0:7] signal connections and clocked by the data clock WCK0_t and WCK0_c. The memory system 250 may receive 16 bits of the data mask DM0 serially (e.g., based on the data clock WCK0_t and WCK0_c) to mask certain portions of the received data from the write operation. In some examples, the 16 bytes of data and 16 bits of the data mask DM0 may be received by the memory system 250, with each bit of the data mask DM0 masking a corresponding byte of the received data. At Tc0-Tc2, the RDQS_t signal connection may be a Hi-Z condition. In a read operation, the RDQS_t signal connection may be configured to provide a read data strobe (RDQS) from the memory system 250 to the host 110.

Figure 4A:
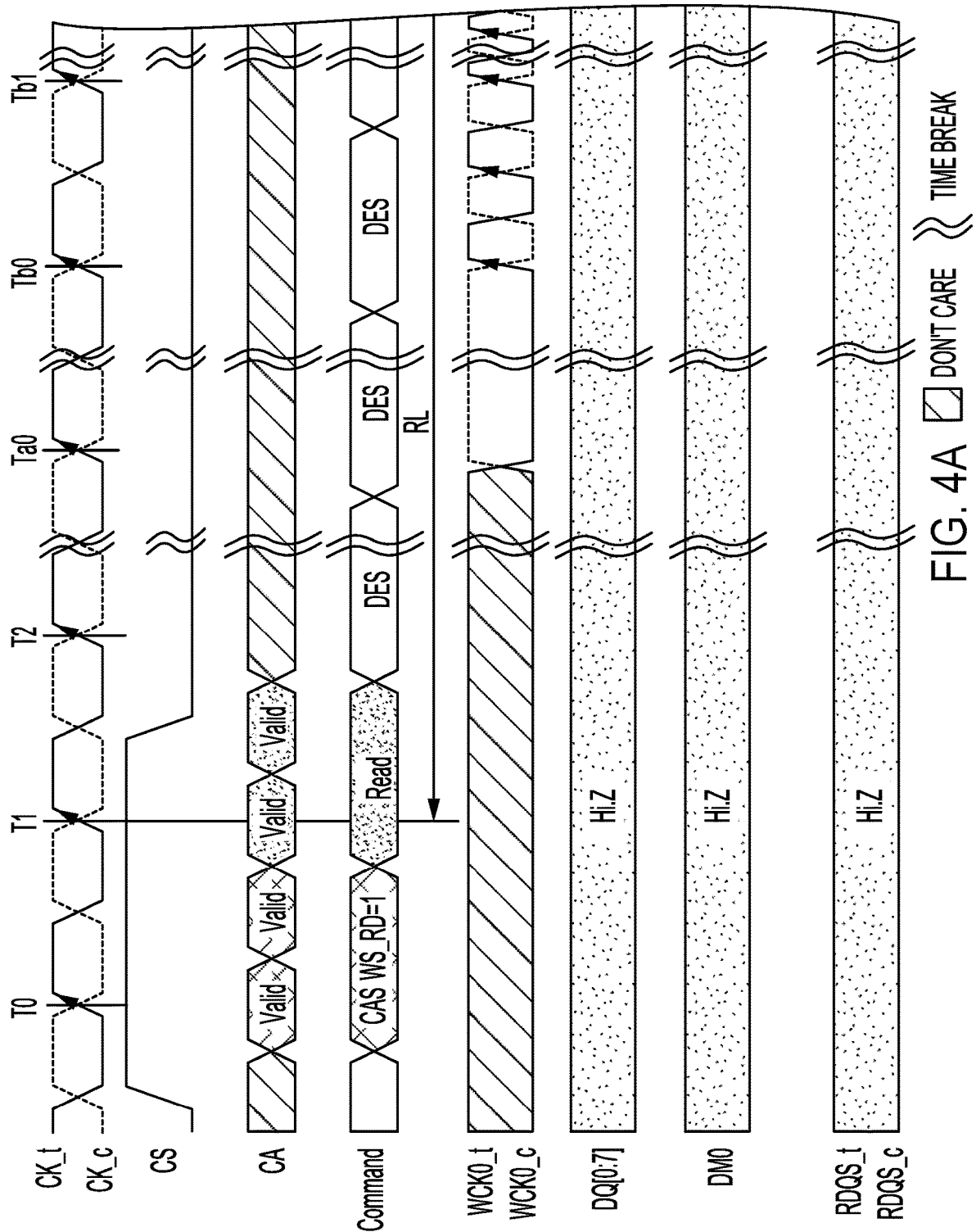
FIG. 4A and FIG. 4B illustrate waveforms for transfer of data through an example channel in a read operation in accordance with certain aspects of the present disclosure.
Figure 4B:
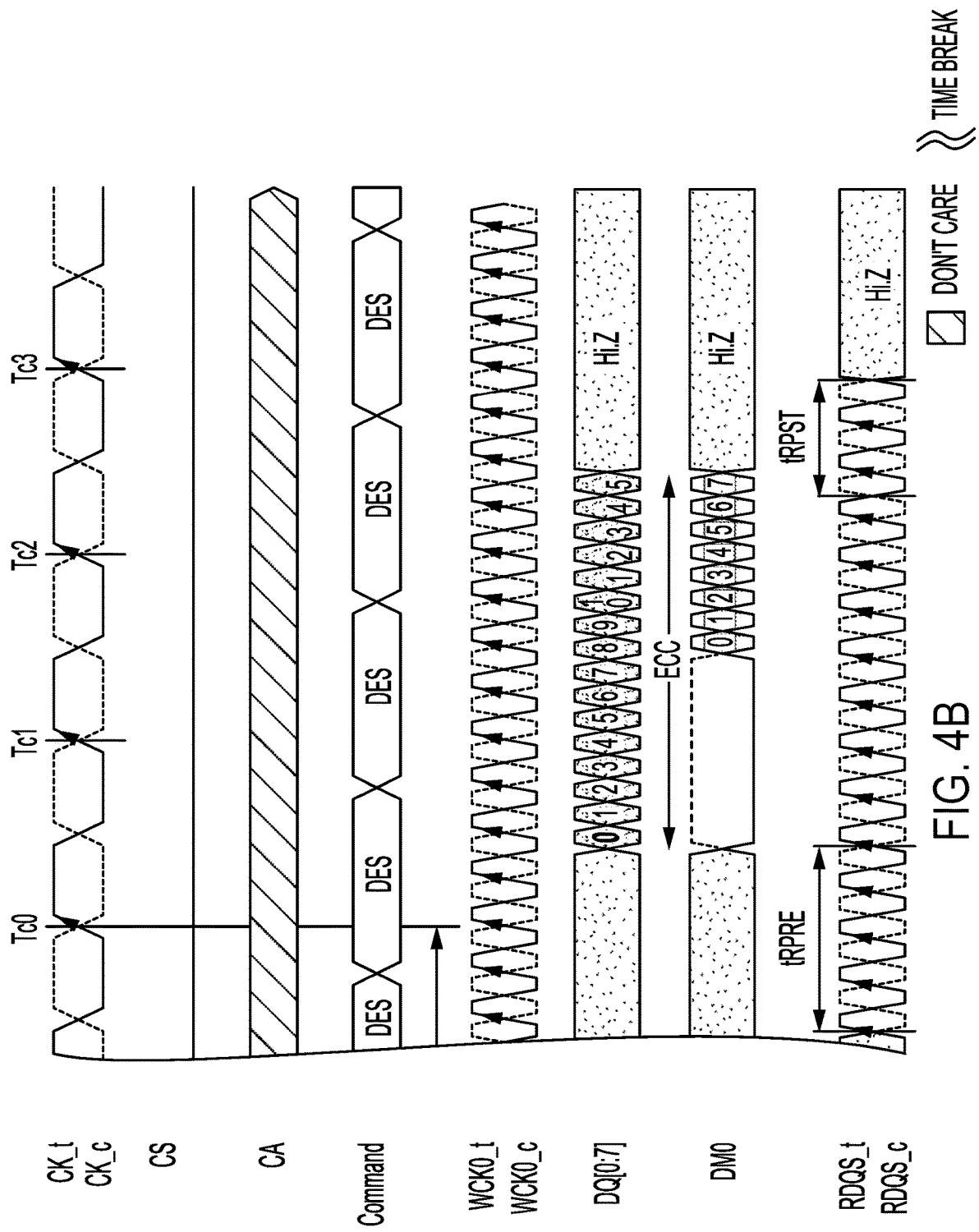

FIG. 4A and FIG. 4B illustrate waveforms for transfer of data through an example channel in a read operation in accordance with certain aspects of the present disclosure. The command and address clock, CK, may be a differential signal having CK_t and CK_c signal connections. The data clock WCK may be a differential signal having WCK0_t and WCK0_c signal connections. The read data strobe RDQS may be a differential signal having RDQS_t and RDQS_c signal connections. The data mask is labeled DM0 to indicate that DM0 corresponds to a lower byte of DQs (DQ[0:7]). At T0 (rising edge of CK_t and falling edge of CK_c), a CAS command may be provided by the host 110 for a read operation to the memory system 250. At T1, a read command may be provided by the host 110 to the memory system 250.

After a time period read latency (RL), the memory system 250 may toggle the read data strobe RDQS to provide the host 110 with clocking to receive data for the read operation on the DQ signal connections. At Tc0-Tc2, the host 110 may receive 16 bytes of data serially, on each of the DQ[0:7] signal connections and clocked by the read data strobe RDQS_t and RDQS_c. Thus, in the example, 16 bytes of data are received by the host 110.

At Tc0-Tc2, the data mask DM0 signal connection may be in a Hi-Z condition. In a write operation, the DM signal connection may be configured to provide a data mask from the host 110 to the memory system 250, which is clocked by WCK0_t and WCK0_c.

Figure 5:
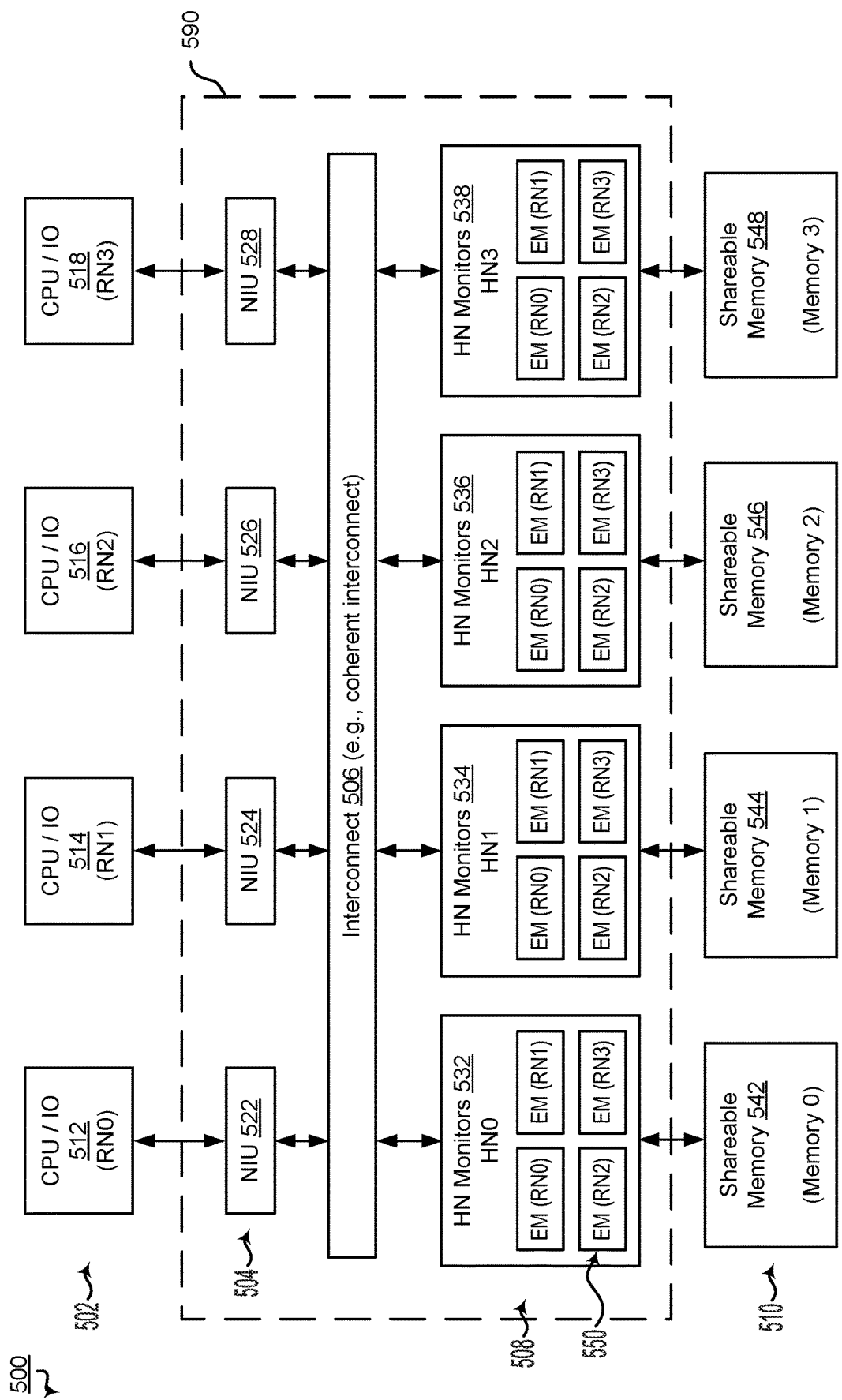
FIG. 5 is a block diagram illustrating an example of a system-on-a-chip (SoC) that supports exclusive read and write operations according to some embodiments of the disclosure.

Referring to FIG. 5, FIG. 5 is a block diagram 500 illustrating an example of a system-on-a-chip (SoC) that supports exclusive read and write operations according to some embodiments of the disclosure. The example SoC of FIG. 5 includes an architecture for exclusive monitors where the exclusive monitors are on a memory side of a CPU-to-memory interconnect, and more specifically where the exclusive monitors reside in hardware monitors for the memory devices. Each hardware monitor, often referred to as a home node (HN) is coupled to and associated with a shared memory device and may include an exclusive monitor (EM) for each CPU that accesses a particular shared memory address. Operations of the example SoC architecture of FIG. 5 are illustrated and described with reference to FIG. 6.

The example SoC of FIG. 5 includes a plurality of CPUs 502, a plurality of network interface units (NIUs) 504, an interconnect 506, a plurality of home nodes monitors 508, and a plurality of shared memory devices 510.

The plurality of CPUs 502 include two or more processing units or processors. Each CPU may include or correspond to processing cores, chips, or chiplets of a SoC. Each CPU may include or correspond to a request node (RN), and may include or have a corresponding interface unit to coordinate with the memory via an interconnect.

Each CPU may be configured to process instructions and read and write data to and from the plurality of shared memory devices 510. Each CPU of the plurality of CPUs 502 may be configured to access the same shared memory of the plurality of plurality of shared memory devices 510 and may engage in exclusive data read and/or data write operations to control data integrity or data race situations.

The plurality of network interface units (NIUs) 504 include two or more NIUs each of which correspond to an interface unit that is associated with and monitors a CPU of the plurality of CPUs 502. In some implementations, the CPUs or the NIUs include local exclusive monitors configured to track exclusive access to dedicated or non-shared memory addresses for the CPU.

The interconnect 506 includes connection circuitry and logic for connecting or coupling each NIU of the plurality of NIUs 504 to each home node monitor of the plurality of home node monitors 508. The interconnect 506 is configured to connect or couple each CPU of the plurality of CPUs 502 to each memory device of the plurality of shared memory devices 510. For example, the interconnect 506 may be configured to provide messages from the RN or CPU to a corresponding HN and memory device. The interconnect 506 may include or correspond to a coherent interconnect in some implementations.

The plurality of home node monitors 508 include two or more home node monitors each of which correspond to a hardware monitor that is associated with and monitors a corresponding memory device of the plurality of shared memory devices 510. Each home node monitor is configured to monitor or track addresses of the associated memory device to which it is coupled and may communicate with the plurality of CPUs 502 via the interconnect 506. The home node monitors may include or correspond to home nodes (HNs) that are associated with one or more memory devices. The home nodes (HNs) may process or coordinate access to their corresponding memory device or devices. For example, the HNs may coordinate data read and data write operations to the plurality of shared memory devices 510.

In the example of FIG. 5, each home node monitor has a plurality of exclusive monitors 550 which are configured to store a state of a memory address to indicate whether it has been accessed. The states may include armed or cleared. A read instruction, such as a read data exclusive (RDE), a load, a load-Exclusive, or a read-exclusive, may arm the monitor for a particular address when the monitor is clear or not armed. A write instruction, such as a write data exclusive (WDE), a store, a store-exclusive, a write-unique-exclusive (WUE), or a write-exclusive, may clear the monitor for the particular address when armed.

The exclusive monitors may include local exclusive monitors for local or non-shared memory addresses and global exclusive monitors for shared memory addresses. Each home node monitor may have large amounts of global exclusive monitors as each home node monitor has a separate global exclusive monitor for each address per RN (e.g., per CPU). To illustrate, in the example of FIG. 5 where 4 CPUs are illustrated, each home node monitor has 4 global exclusive monitors per address. A global monitor may track access to shared memory regions and may ignoring or not indicate which RN has tagged the address. A local monitor tracks which RN has accessed a given memory region, and may be located in the HN or RN.

The plurality of shared memory devices 510 include two or more memory devices which are shared between the plurality of CPUs 502. Each memory device may include a plurality of memory addresses. The memory addresses may include dedicated memory addresses for a specific CPU and shared memory addresses which can be accessed by one or more CPUs. The memory device may include or correspond to a volatile memory or a non-volatile memory. In some implementations, the memory device includes or corresponds to RAM. In some such implementations, the RAM-based memory device corresponds to a DRAM device including DRAM cells. In other implementations, the RAM-based memory device corresponds to another type of RAM, such as SRAM, NVRAM, ECC RAM, SDRAM, DDR, GDDR, MRAM, etc. In other implementations, the memory device includes or corresponds to flash memory, ROM, etc.

In FIG. 5, a network-on-chip (NoC) 590 is illustrated as a dashed box and includes the plurality of NIUs 504, the interconnect 506, and the plurality of HN monitors 508. The NoC 590 is a network-based communication system of the SoC, and is configured to handle communications between components/modules of the SoC.

In the example of FIG. 5, the plurality of CPUs 502 include four CPUs 512-518, the plurality of NIUs 504 include four NIUs 522-528, the plurality of home nodes monitors 508 include four HNs 532-538, and the plurality of shared memory devices 510 include four shared memory devices 542-548. Each HN of the four HNs 532-538 includes a plurality of exclusive monitors 550 (e.g., global exclusive monitors) to track exclusive access to the shared memory. In the example of FIG. 5, each HN includes four exclusive monitors, EM RN0-RN4, one for each CPU of the four CPUs 512-518. The operations of the components of the example SoC of FIG. 5 are described with reference to FIG. 6.

Although the example of FIG. 5 illustrates a particular implementation where the SoC architecture includes four of each component, in other implementation there SoC may include different amounts of components. For example, there may be more or fewer CPUs, NIUs, HNs, memory devices, or a combination thereof. To illustrate, in another particular implementation, the SoC may include two CPUs and three memory devices, and in another particular implementation the SoC may include five CPUs and two memory devices.

In the example of FIG. 5, the SoC includes fairness counters and utilizes the fairness counters, along with accompanying fairness logic, to ensure exclusive access fairness between the RNs. The counters and logic may be referred to as exclusive access fairness counters and exclusive access fairness logic. The fairness logic may be configured to adjust the fairness counters responsive to a success and/or a failure of an exclusive access operation, such as an exclusive access read, or an exclusive access write. Each home node monitor (e.g., each exclusive monitor thereof) of the home node monitors 508 may have a corresponding fairness counter, such as per shared thread or per shared memory address. In some implementations, fairness counter adjustment logic is configured to clear a corresponding fairness counter based on a successful write data exclusive command, and configured to increase the corresponding fairness counter based on a failed data exclusive command. In some such implementations, when a write data exclusive command is received, the exclusive monitors for the particular request node compare its counter, counter value, to the counter values (e.g., maximum counter value) of all counters with a matching address. When the counter for the received write data exclusive command is at the maximum value, the received write data exclusive command is allowed to succeed by the home node.

Figure 6:
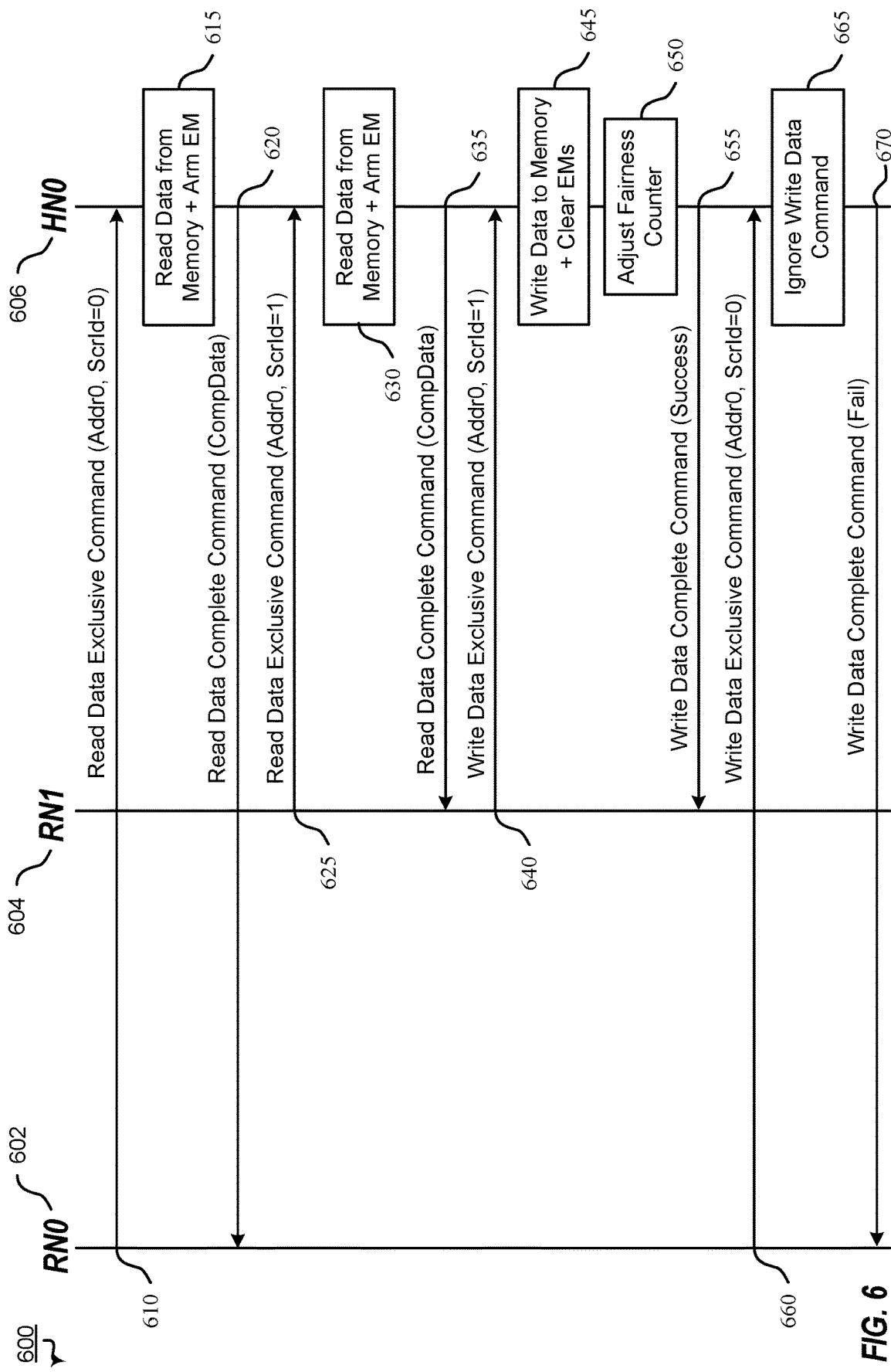
FIG. 6 is a flow diagram illustrating operations for exclusive read and write operations according to some embodiments of the disclosure.

Referring to FIG. 6, FIG. 6 illustrates example read and write operations of one example of a SoC architecture according to some embodiments of the disclosure. FIG. 6 illustrates an example of operations of one or more components of a SoC, including RNs and HNs thereof, during an exclusive read and exclusive write operations. In FIG. 6, the SoC and components thereof may include any of the memory or SoC components of FIGS. 1-5.

FIG. 6 is a flow diagram 600 illustrating operations for exclusive read and write operations according to some embodiments of the disclosure. The exclusive read and write operations may be performed by a SoC architecture as illustrated in FIG. 5, and including an EM layout with EMs on the memory or HN side of the CPU-to-memory interconnect. The EMs may be located in each memory device or in each HN associated therewith.

In FIG. 6, multiple request nodes (RN) and a host node (NH) are illustrated and perform the operations depicted. As illustrated in the example of FIG. 6, the diagram 600 includes a first request node 602 (RN0), a second request node 604 (RN1), and a first home node 606 (HN0). The first request node 602 (RN0) and the second request node 604 (RN1) may include or correspond to any of the CPUs 502 of FIG. 5 and/or the NIUs 504 of FIG. 5. For example, the first request node 602 (RN0) may include or correspond to the first CPU 512, the first NIU 522, or both, and the second request node 604 (RN1) may include or correspond to the second CPU 514, the second NIU 524, or both. The first home node 606 (HN0) may include or correspond to any of the home node monitors 508 of FIG. 5. In some implementations, the operations may be performed by the memory controller 130 of the host 110 of FIG. 1, the memory controller 180 of the memory system 250 of FIG. 2, or one or more of the SoC components of FIG. 5.

The operations include, at 610, transmitting, by the first request node 602 (RN0), a read data exclusive command. For example, the first request node 602 (RN0) transmits a first read data exclusive command to a first home node 606 (HN0) for a first address (addr0) of a first shared memory device (e.g., Mem0).

The read data exclusive command is a command to read data at a particular shared memory address and the requesting node is indicating that the data be tracked as exclusive. While the data is being tracked as exclusive other devices may be able to access the data at the shared memory address and optionally even write to the shared memory address (e.g., modify the data). However, if the data is changed by another request node, all other request nodes with an exclusive monitor monitoring the particular shared memory address may not be able to write the data at a later time without another read operation.

At 615, the first home node 606 (HN0) reads data from the memory and arms an exclusive monitor. For example, the first home node 606 (HN0) reads data from the first shared memory device (e.g., Mem0) stored at the first address based on the read data exclusive command. To illustrate, the first home node 606 (HN0) communicates with the first shared memory device (e.g., Mem0) to obtain the data at the first address. The first home node 606 (HN0) arms a global exclusive monitor based on reading the data and receiving the first read data exclusive command. For example, the first request node 602 (RN0) arms a corresponding global exclusive monitor associated with the first request node 602 (RN0) and for the first shared memory address based on receiving the first read data exclusive command. To illustrate, the first home node 606 (HN0) arms a global exclusive monitor (EM RN0) at the first home node 606 (HN0) that corresponds to the first request node 602 (RN0).

At 620, the first home node 606 (HN0) transmits a read data complete command. For example, the first home node 606 (HN0) transmits a read data complete command to the first request node 602 (RN0) that includes or indicates the data read from the first shared memory device (e.g., Mem0) stored at the first address based on and responsive to the read data exclusive command and arming the exclusive monitor.

At 625, a second request node 604 (RN1) transmits a read data exclusive command. For example, the second request node 604 (RN1) transmits a second read data exclusive command to the first home node 606 (HN0) for the first address (addr0) of the first shared memory device (e.g., Mem0).

At 630, the first home node 606 (HN0) reads data from the memory and arms an exclusive monitor. For example, the first home node 606 (HN0) reads data from the first shared memory device (e.g., Mem0) stored at the first address based on the read data exclusive command. To illustrate, the first home node 606 (HN0) may communicate with the first shared memory device (e.g., Mem0) to obtain the data at the first address or may retrieve the data from a cache. The first home node 606 (HN0) arms a global exclusive monitor based on reading the data and receiving the second read data exclusive command. For example, the second request node 604 (RN1) arms a corresponding global exclusive monitor associated with the second request node 604 (RN1) and for the first shared memory address based on receiving the second read data exclusive command. To illustrate, the first home node 606 (HN0) arms a second global exclusive monitor (EM RN1) at the first home node 606 (HN0) that corresponds to the second request node 604 (RN1).

At 635, the first home node 606 (HN0) transmits a read data complete command. For example, the first home node 606 (HN0) transmits a second read data complete command to the second request node 604 (RN1) that includes or indicates the data read from the first shared memory device (e.g., Mem0) stored at the first address based on and responsive to the second read data exclusive command.

At 640, the second request node 604 (RN1) transmits a write data exclusive command. For example, the second request node 604 (RN1) transmits a write data exclusive command to the first home node 606 (HN0) for the first address (addr0) of the first shared memory device (e.g., Mem0). To illustrate, the second request node 604 (RN1) may determine to send the write data exclusive command for the first address based on receiving the data and/or receiving the second read data complete command.

At 645, the first home node 606 (HN0) writes data to the memory and clears the exclusive monitors. For example, the first home node 606 (HN0) determines to write the data to the first shared memory address of the first shared memory device based on the second exclusive monitor (EM RN1) for the second request node 604 (RN1) being set or armed. The first home node 606 (HN0) may then clear the first and second exclusive monitors (EM RN0 and EM RN1) based on writing the data to the memory, such as receiving a write data complete message from the DRAM.

At 650, the device adjusts an exclusive access fairness counter. For example, the first home node 606 (HN0) adjusts an exclusive access fairness counter for the second request node 604 (RN1), and optionally for the first request node 602 (RN0). To illustrate, the first home node 606 (HN0) adjusts a fairness counter for the second request node 604 (RN1) and for first shared memory address of the first shared memory device based on the second exclusive monitor being cleared at 645, or the write data complete command sent at 655, which was based on the write data exclusive command. Additionally, the first home node 606 (HN0) adjusts a fairness counter for the first request node 602 (RN0) and for first shared memory address of the first shared memory device based on the second exclusive monitor being cleared at 645, or the write data complete command sent at 655, which was based on the write data exclusive command.

In some implementations, the device (e.g., home nodes thereof) includes fairness counter adjustment logic configured to clear a corresponding fairness counter based on a successful write data exclusive command, and configured to increase the corresponding fairness counter based on a failed data exclusive command. In some such implementations, when a write data exclusive command is received, the exclusive monitors for the particular request node compare its counter, counter value, to the counter values (e.g., maximum counter value) of all counters with a matching address. When the counter for the received write data exclusive command is at the maximum value, the received write data exclusive command is allowed to succeed by the home node. Otherwise, the home node may force the received write data exclusive command to fail.

Such counter-based exclusive access fairness schemes cause write commands to fail directly instead of making the concurrent access wait. Additionally, such counter-based exclusive access fairness schemes can be negatively and greatly impacted by spurious write commands or exclusive access requests, such as write data exclusive commands.

At 655, the first home node 606 (HN0) transmits a write data complete command. For example, the first home node 606 (HN0) transmits a write data exclusive complete command to the second request node 604 (RN1) that includes or indicates the data write for the first address of the first shared memory device (e.g., Mem0) is successful and complete based on and responsive to the write data exclusive command.

At 660, the first request node 602 (RN0) transmits a write data exclusive command. For example, the first request node 602 (RN0) transmits a second write data exclusive command to the first home node 606 (HN0) for the first address (addr0) of the first shared memory device (e.g., Mem0). To illustrate, the first request node 602 (RN0) may determine to send the write data exclusive command for the first address based on receiving the data and/or receiving the first read data complete command.

At 665, the first home node 606 (HN0) does not write the data to the memory. For example, the first home node 606 (HN0) determines to not write the data to the first shared memory address of the first shared memory device for the second write data exclusive command from the first request node 602 (RN0) based on the first exclusive monitor (EM RN0) for the first request node 602 (RN0) being clear or not armed. The first home node 606 (HN0) may ignore the write command.

At 670, the first home node 606 (HN0) transmits a write data fail command. For example, the first home node 606 (HN0) transmits a write data exclusive fail command to the first request node 602 (RN0) that indicates data was not written to the first shared memory address based on and responsive determining not to write the data to the memory. The first request node 602 (RN0) may then proceed with another or third read command, similar to the read data exclusive command at 610, to access the updated data the first address and to rearm the corresponding exclusive monitor (EM RN0) before trying (retrying) to write updated data to the first address.

After 670, the device adjusts an exclusive access fairness counter. For example, the first home node 606 (HN0) adjusts an exclusive access fairness counter for the first request node 602 (RN0), and optionally for the second request node 604 (RN1). To illustrate, the first home node 606 (HN0) adjusts a fairness counter for the first request node 602 (RN0) and for first shared memory address of the first shared memory device based on the second write data complete command indicating a failure at 670, which was based on the second write data exclusive command.

Figure 7:
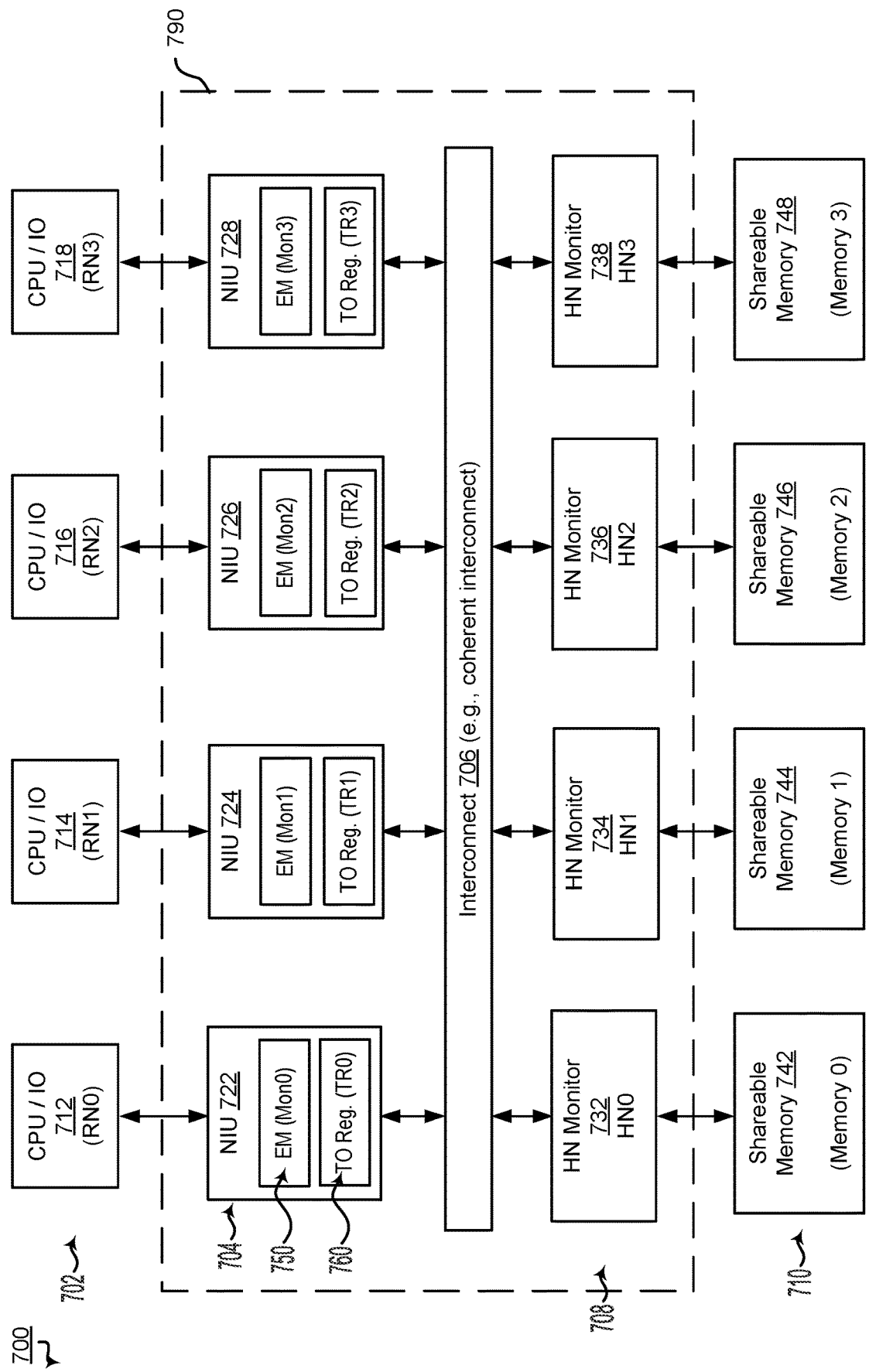
FIG. 7 is a block diagram illustrating an example of a SoC that has a scalable EM architecture and supports enhanced exclusive access fairness operations according to some embodiments of the disclosure.

Referring to FIG. 7, FIG. 7 is a block diagram 700 that illustrates an example of a SoC that has a scalable EM architecture and supports enhanced exclusive read and write operations according to some embodiments of the disclosure. The example SoC of FIG. 7 includes an architecture for exclusive monitors where the exclusive monitors are on a RN side of a RN-to-memory interconnect and reside in NIUs. Each NIU is coupled to and associated with a RN (a CPU in the example of FIG. 7) and may include an exclusive monitor (EM) for each shared memory address that the RN accesses or has access to. Operations of the example SoC architecture of FIG. 7 are illustrated and described with reference to FIG. 8.

As compared to the example SoC architecture of FIG. 5, the example SoC architecture of FIG. 7 has less overall exclusive monitors because the exclusive monitors are moved "upstream" and closer to the RNs. To illustrate, redundant exclusive monitors for a particular RN (and memory address) that are distributed across the multiple hardware monitors for the different memory devices can now be combined at a single NIU. By moving the exclusive monitors upstream and to the other side of the RN-to-memory interconnect, the home node monitors (or HNs) may utilize coherency operations (e.g., snoop request and messages) to determine a status of the exclusive monitor for read and write operations (e.g., exclusive reads and exclusive write operations) and to manage the status of the exclusive monitors (e.g., arm or clear).

The example SoC of FIG. 7 includes a plurality of request nodes, such as CPUs 702, a plurality of network interface units (NIUs) 704, an interconnect 706, a plurality of home nodes monitors 708, and a plurality of shared memory devices 710.

The plurality of CPUs 702 include two or more processing units or processors. The CPUs may include or correspond to processing cores, chips, or chiplets of a SoC. The plurality of CPUs 702 may include or correspond to the plurality of CPUs 502 of FIG. 5.

Each CPU may be configured to process instructions and read and write data to and from the plurality of shared memory devices 710. Each CPU of the plurality of CPUs 702 may be configured to access the same shared memory of the plurality of plurality of shared memory devices 710 and may engage in exclusive data read and/or data write operations to control data integrity or data race situations.

The plurality of network interface units (NIUs) 704 include two or more NIUs each of which correspond to an interface unit that is associated with and monitors a CPU of the plurality of CPUs 702. The plurality of NIUs 704 may include or correspond to the plurality of NIUs 504 of FIG. 5. In some implementations, the CPUs or the NIUs include local monitors configured to track exclusive access to dedicated or non-shared memory addresses for the CPU.

In the example of FIG. 7, each NIU has a plurality of exclusive monitors 750 which are configured to store a state of a memory address to indicate whether it has been accessed. The states may include armed or cleared. A read instruction, such as a read data exclusive (RDE), a load, a load-Exclusive, or a read-exclusive, may arm the exclusive monitor for a particular address when the monitor is clear or not armed. A write instruction, such as a write data exclusive (WDE), a store, a store-exclusive, a write-unique-exclusive (WUE), or a write-exclusive, may clear the exclusive monitor for the particular address when armed.

In the example of FIG. 7, the exclusive monitors include extended or distributed exclusive monitors. The exclusive monitors of FIG. 7 may be considered to be extended or distributed exclusive monitors as exclusive monitors are extended or distributed to the RNs from the HNs. The exclusive monitors may also be considered to be consolidated or common exclusive monitors because the previous exclusive monitors for a particular RN, such as EM RN0 at each of the HMs, may be consolidated at the particular RN, i.e., a single RN, or common to the particular RN.

The exclusive monitors may include exclusive monitors for local or non-shared memory addresses (often referred to as local exclusive monitors), exclusive monitors for shared memory addresses (often referred to as global exclusive monitors), or a combination thereof. As compared to the example of FIG. 5 where exclusive monitors are placed at the home node monitors (HNs) or on the memory side of the interconnect 706, in the example of FIG. 7 the exclusive monitors are moved to the NIUs and the NIUs may include fewer exclusive monitors than their corresponding home node monitors as in FIG. 5. To illustrate, a NIU may only need one exclusive monitor per thread or per memory address and exclusive monitors for the RN (e.g., CPUs) are not repeated across different NIUs or home node monitors. For example, the second NIU or home node monitor does not include exclusive monitors for the first CPU, the third CPU, or the fourth CPU like the home nodes of FIG. 5. In this manner, the amount of exclusive monitors can be vastly decreased by eliminating redundant exclusive monitors. This reduction in exclusive monitors can greatly reduce chip size due to the reduction in area used for exclusive monitors. For example, the area used for exclusive monitors in FIG. 7 may be reduced to a square root of the original area used for exclusive monitors in FIG. 5.

However, as home node monitors may still be used to control exclusivity or access to shared memory addresses, the home node monitors may communicate with the exclusive monitors of the NIUs to determine the status thereof for determining when and how to perform data write and read commands, such as exclusive data write or read commands.

The request node and corresponding NIU and exclusive monitor thereof may include fairness logic configured to perform exclusive access fairness operations to ensure a fairness scheme among the request nodes. In the example of FIG. 7, each NIU includes a corresponding timeout register 760 (e.g., a delay register) configured to store a timeout value used for performing exclusive access fairness operations. The timeout register 760 may be set and adjusted, such as incremented or decremented, by the fairness logic responsive to exclusive access operations as further described herein. The timeout register 760 may be adjusted over time to act as a timer, referred to as a timeout timer or delay timer.

The interconnect 706 includes connection circuitry and logic for connecting or coupling each NIU of the plurality of NIUs 704 to each home node monitor of the plurality of home node monitors 708. The interconnect 706 is configured to connect or couple each CPU of the plurality of CPUs 702 to each memory device of the plurality of shared memory devices 710. For example, the interconnect 706 may be configured to provide messages from the RN or CPU to a corresponding HN and memory device. The interconnect 706 may include or correspond to the interconnect 506 of FIG. 5. In some implementations, the interconnect 706 may include or correspond to a coherent interconnect.

The plurality of home node monitors 708 include two or more memory devices each of which correspond to a home node monitor that is associated with and monitors a memory device of the plurality of shared memory devices 710. Each home node monitor is configured to interact with the plurality of NIUs 704, such as the exclusive monitors 750 thereof, to determine a status of the data of the shared memory to control operations of the home node monitors 708 and the plurality of shared memory devices 710. The plurality of home node monitors 708 may include or correspond to the plurality of home node monitors 508 of FIG. 5. The home node monitors may include or correspond to home nodes (HNs) that are associated with one or more memory devices. The home nodes (HNs) may process or coordinate access to their corresponding memory device or devices. For example, the HNs may coordinate data read and data write operations to the plurality of shared memory devices 710.

The plurality of shared memory devices 710 include two or more memory devices which are shared between the plurality of CPUs 702. Each memory device may include a plurality of memory addresses. The memory addresses may include dedicated memory addresses for a specific request node, e.g., CPU. and shared memory addresses which can be accessed by one or more request nodes, e.g., CPUs. The memory device may include or correspond to a volatile memory or a non-volatile memory. In some implementations, the memory device includes or corresponds to RAM. In some such implementations, the RAM-based memory device corresponds to a DRAM device including DRAM cells. In other implementations, the RAM-based memory device corresponds to another type of RAM, such as SRAM, NVRAM, ECC RAM, SDRAM, DDR, GDDR, MRAM, etc. In other implementations, the memory device includes or corresponds to flash memory, ROM, etc.

In FIG. 7, a NoC 790 is illustrated as a dashed box and includes the plurality of NIUs 704, the interconnect 706, and the plurality of HN monitors 708. The NoC 790 is a network-based communication system of the SoC, and is configured to handle communications between components/modules of the SoC, and may include or correspond to the NoC 590 of FIG. 5. For example, the NoC 790 may handle communications between the RNs themselves, between the RNs and the memory devices, between the RNs and other components of the SoC not shown in FIG. 7, etc. In the example of FIG. 7, the EMs have been moved from the bottom of the NoC 590 as in the SoC of FIG. 5, to the top of the NoC as in the SoC of FIG. 7. The movement of the EMs within the NoC 790 distributes the EMs throughout the NoC 790 and places them physically closer to the RNs.

Although the example of FIG. 7 illustrates a particular implementation where the SoC architecture includes four of each component, in other implementation there SoC may include different amounts of components. For example, there may be more or fewer CPUs, NIUs, HNs, memory devices, or a combination thereof. To illustrate, in another particular implementation, the SoC may include two CPUs and three memory devices, and in another particular implementation the SoC may include five CPUs and two memory devices. Additionally, or alternatively, although the example of FIG. 7 illustrates a particular implementation where the RNs are all CPUs, in other implementations, the RNs may include or correspond to one or more other types of processors or ICs, such as DSPs, Image Processing Units (ISPs), GPUs, NPUs, video coders, modems, etc.

In the example of FIG. 7, the plurality of CPUs 702 include four CPUs 712-718, the plurality of NIUs 704 include four NIUs 722-728, the plurality of home nodes monitors 708 include four HNs 732-738, and the plurality of shared memory devices 710 include four shared memory devices 742-748. The four NIUs 722-728 includes a plurality of exclusive monitors 750 (e.g., RN-based exclusive monitors). In the example of FIG. 7, each NIU includes one exclusive monitor (e.g., EM RN0 or EM RN1) corresponding to a particular CPU of the four CPUs 712-718. The operations of the components of the example SoC of FIG. 7 are described with reference to FIGS. 8 and 9.

In the example of FIG. 7, the SoC includes fairness related timers and utilizes the fairness related timers, along with accompanying fairness logic, to ensure exclusive access fairness. The fairness related timers and logic may be referred to as exclusive access fairness timers and exclusive access fairness logic. The fairness related timers and logic may function to provide a delay or timeout period where a request node can complete a write data exclusive command after completing an associated read data exclusive command.

The fairness logic may be configured to start a fairness timer based on or responsive to receipt of a message responsive to an exclusive access operation. For example, the fairness logic may be configured to start a fairness timer for a particular memory address based on a receipt of a response to a read data exclusive command (e.g., receipt of the read data) or responsive to arming of the exclusive monitor from sending a read data exclusive command. Additionally, or alternatively, the fairness logic may be configured to start a fairness timer responsive to a success and/or a failure of an exclusive access operation, such as an exclusive access read, or an exclusive access write. For example, the fairness logic may be configured to start a fairness timer for a particular memory address based on a successful read data exclusive command, such as sending of a read data exclusive complete acknowledge message.

The fairness logic may be configured to adjust the fairness timers responsive to a success and/or a failure of an exclusive access operation, such as an exclusive access read, or an exclusive access write. In some aspects herein, the fairness logic may be configured to adjust the fairness timers responsive to a success and/or a failure of an exclusive access operation with multiple exclusive access commands, such as a success of a read exclusive access command and a success of a corresponding write exclusive access command for the same address. Each exclusive monitor of the NIUs may have a corresponding fairness timer, such a per shared memory address fairness timer. In some implementations, fairness timer adjustment logic is configured to decrease a corresponding fairness timer based on a successful write data exclusive command, and configured to increase the corresponding fairness timer based on a failed data exclusive command. In some such implementations, when a write data exclusive command is completed successfully the timer is decreased to help other request nodes gain exclusive access. Additionally, when a write data exclusive command fails (i.e., not completed successfully) the timer is increased to help the requesting request node gain exclusive access for a subsequent exclusive access command.

In some implementations, the fairness logic may include timer adjustment logic (e.g., timer adjustment value logic) configured to adjust the value of the adjustment amount to timer based on a success, a failure or both. For example, the timer adjustment logic may be configured to decrease the adjustment value over time to reduce the sequential impact from additional or repetitive failures or success. Alternatively, the timer adjustment logic may be configured to increase the adjustment value over time to increase the sequential impact from additional or repetitive failures or success. The timer adjustment logic may employ a counter and/or a timer to adjust the adjustment value after each success or failure. In some such implementations, hysteresis logic may be employed to prevent flip-flopping between values and/or adjustment. Additional, or alternatively, the timer adjustment logic may utilize a low pass filter to used to reduce the value or significance of the changes to the timeout timer starting value responsive an amount of timeout timer adjustments or an amount timeout timer adjustments with a particular time period.

As compared to the example of FIG. 5, the SoC in the example of FIG. 7 does not include or use fairness counters to ensure exclusive access fairness between the request nodes. Rather, the SoC in the example of FIG. 7 includes timeout registers and utilizes timeout timers or delays to ensure exclusive access fairness between the request nodes. Utilizing fairness counters to ensure exclusive access fairness in the SoC of FIG. 7 may cause issues with the distributed architecture of the EMs, such as by needing to adjust and monitor EMs in more places. For example, using fairness counters with distributed EMs may result in many failed commands as most concurrent exclusive access commands would be failed upon receipt until a counter value was reached. Additionally, spurious exclusive access commands can reduce system performance and impact fairness among the RNs.

Some additional benefits of the aspects described herein includes reduces errors in fairness programming. For example, there is no need to reprogram fairness logic when a processor has a frequency change. As another example, the architecture or topology allows for flexibility in that several processors can be aggregated on a same NIU, and these processors may change frequency independent of one another. There is no need to program each EM separately, such as based on thread speed. As threads are assigned at run-time threads cannot be programmed at the design stage, but the timeout timer value can be adjusted based on operation. Accordingly, one value may be assigned per NIU, and then the value can be adjusted on a per EM/thread basis during operation to ensure fairness per thread.

In some implementations, when a read data exclusive command comes in, the read data exclusive command will cause a line/entry to be written into a directory, such as snoop filter or snoop filter directory. For example, the HN and/or EM creates an entry in a snoop filter directory. The read data exclusive command, such as a response thereto, also causes arming of the EM and starting of the timeout timer. If a HN or armed EM receives a matching write data exclusive command for the address of the read data exclusive command, snoop query operations may be performed, and a snoop query message may be sent by the snoop filter.

In a failure scenario, the RN of the write data exclusive command is identified in the directory entry as having lost the line and exclusivity, and a failure indication is provided to the RN.

In a success scenario, the RN of the write data exclusive command is identified in the directory entry as having the line and exclusivity, and the data is written into the memory and a success response is given to the RN. The matching cache lines may be invalidated, and matching EMs are disarmed by snoop procedures based on the directory entry.

In some such implementations, a response or an acknowledgement for the read data exclusive command is sent based on one or more triggers or conditions. For example, the response or acknowledgement for the read data exclusive command may be sent based on or responsive to: a successful exclusive access sequence (e.g., a write data exclusive command with a matching address or identifier is received (e.g., same database identifier (DbId)), an (e.g., updated) read data exclusive command comes in from the same RN, the EM is cleared by snoop clean command, an external force clear event, or expiration of the timeout timer. The response or acknowledgement for the read data exclusive command may be configured to release, or to cause the release of, all hazard checks at the HN related to the read data exclusive command. The response or acknowledgement for the read data exclusive command may be a ExpCompAck or a COMP_ACK that is sent on a CAck channel.

Figure 8:
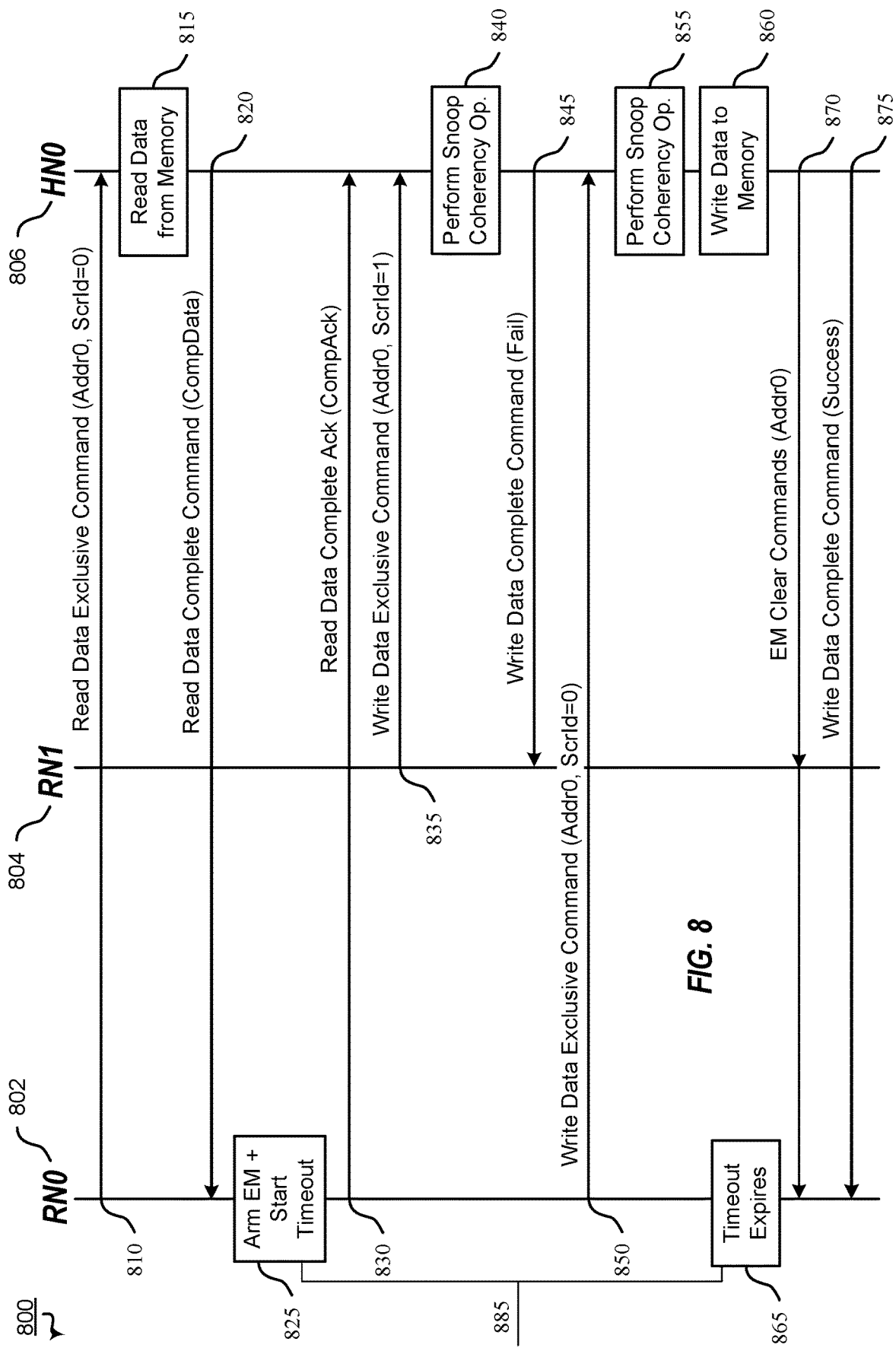
FIG. 8 is a flow diagram illustrating an example of enhanced exclusive access fairness operations according to some embodiments of the disclosure.

Referring to FIG. 8, FIG. 8 illustrates example read and write operations of one example of a SoC architecture according to some embodiments of the disclosure. FIG. 8 illustrates an example of exclusive access fairness operations of one or more components of a SoC, including RNs and HNs thereof, during an exclusive read and exclusive write operations. In FIG. 8, the SoC and components thereof may include to any of the memory or SoC components of FIGS. 1-5 and 7.

FIG. 8 is a flow diagram 800 illustrating operations for enhanced exclusive access fairness operations according to some embodiments of the disclosure. The enhanced exclusive access fairness operations may be performed by a SoC architecture as illustrated in FIG. 7, and including a more scalable EM layout with EMs on the CPU or RN side of the RN-to-memory interconnect. The EMs may be located in each RN or in each NIU. The enhanced exclusive access fairness operations utilize an exclusive access delay or timeout period to ensure exclusive access for slower RNs. In the example of FIG. 8, an exclusive access delay or timeout period, illustrated as 885 in FIG. 8, is implemented by a timeout register, such as the timeout register 760, and corresponds to an exclusive access delay or exclusivity duration.

In the example of FIG. 8, a write data exclusive command is issued during an associated timeout period for completing the write data exclusive command. In such operations, the write data exclusive command is guaranteed to succeed and competing (e.g., intervening) write data exclusive commands from other request nodes are failed, delayed, and/or blocked until expiration of the timeout period to ensure completion and success of the original write data exclusive command. In this manner, slower RNs may be able to gain access to data reserved by faster RNs, and even to data that is cached by certain RNs (e.g., CPUs).

In FIG. 8, multiple request nodes (RN) and a host node (NH) are illustrated and perform the operations depicted. As illustrated in the example of FIG. 8, the diagram 800 includes a first request node 802 (RN0), a second request node 804 (RN1), and a first home node 806 (HN0). The first request node 802 (RN0) and the second request node 804 (RN1) may include or correspond to any of the CPUs 702 of FIG. 7 and/or the NIUs 704 of FIG. 7. For example, the first request node 802 (RN0) may include or correspond to the first CPU 712, the first NIU 722, or both, and the second request node 804 (RN1) may include or correspond to the second CPU 714, the second NIU 724, or both. The first home node 806 (HN0) may include or correspond to any of the home node monitors 708 of FIG. 7. In some implementations, the operations may be performed by the memory controller 130 of the host 110 of FIG. 1, the memory controller 180 of the memory system 250 of FIG. 2, or one or more of the SoC components of FIG. 7.

The operations include, at 810, transmitting, by the first request node 802 (RN0), a read data exclusive command. For example, the first request node 802 (RN0) transmits a first read data exclusive command to a first home node 806 (HN0) for a first address (addr0) of a first shared memory device (e.g., Mem0).

The read data exclusive command is a command to read data at a particular shared memory address and the requesting node is indicating that the data be tracked as exclusive. While the data is being tracked as exclusive other devices may be able to access the data at the shared memory address and optionally even write to the shared memory address (e.g., modify the data). However, if the data is changed by another node, all other nodes with may not be able to write the data at a later time without another read operation.

At 815, the first home node 806 (HN0) reads data from the memory. For example, the first home node 806 (HN0) reads data from the first shared memory device (e.g., Mem0) stored at the first address based on the read data exclusive command. To illustrate, the first home node 806 (HN0) communicates with the first shared memory device (e.g., Mem0) to obtain the data at the first address. As compared to FIG. 6, the first home node 806 (HN0) reads the data without arming an exclusive monitor, such as the RN-based exclusive monitor, because the exclusive monitors now reside on the other side of the interconnect 706, such as at the NIUs, as described with reference to the example of FIG. 7.

At 820, the first home node 806 (HN0) transmits a read data complete command. For example, the first home node 806 (HN0) transmits a read data complete command to the first request node 802 (RN0) that includes or indicates the data read from the first shared memory device (e.g., Mem0) stored at the first address based on and responsive to the read data exclusive command.

At 825, the first request node 802 (RN0) arms an exclusive monitor and starts a timeout timer. For example, the first request node 802 (RN0) arms a corresponding exclusive monitor associated with the first request node 802 (RN0) and for the first shared memory address based on receiving the read data complete command and starts the timeout timer by decrementing a timeout register corresponding to the armed exclusive monitor. To illustrate, the first request node 802 (RN0) arms an exclusive monitor (EM Mon0) at the first NIU 722 that corresponds to the first request node 802 (RN0) responsive to the read data complete command. The first request node 802 (RN0) sets a corresponding timeout register for the armed exclusive monitor (EM Mon0) at the first NIU 722 to a particular starting value (e.g., a base timeout value or a previously adjusted timeout value) and starts the timeout timer by decrementing the timeout register responsive to the read data complete command or arming the exclusive monitor.

At 830, the first request node 802 (RN0) transmits a read data acknowledgement. For example, the first request node 802 (RN0) transmits a first read data exclusive acknowledgement message to the first home node 806 (HN0) for the first read data exclusive command for the first shared memory address and responsive to arming the monitor and/or receiving the first read data complete message. The read data acknowledgement message may be sent responsive to arming of the exclusive monitor (EM Mon0) at the first NIU 722 and indicate that the exclusive monitor (EM Mon0) at the first NIU 722 has been successfully armed.

At 835, the second request node 804 (RN1) transmits a write data exclusive command. For example, the second request node 804 (RN1) transmits a write data exclusive command to the first home node 806 (HN0) for the first address (addr0) of the first shared memory device (e.g., Mem0). To illustrate, the second request node 804 (RN1) may determine to send the write data exclusive command for the first address based on determining that the corresponding second exclusive monitor (EM Mon1) at the second NIU 724 is armed for the first address.

At 840, the first home node 806 (HN0) performs snoop coherency operations. For example, the first home node 806 (HN0) performs snoop coherency operations for the first address of the first shared memory device (e.g., Mem0) based on the write data exclusive command. To illustrate, the first home node 806 (HN0) may transmit one or more snoop messages (e.g., snoop query messages) to check on exclusive monitor status (e.g., arm or clear) and to check on exclusive access timeout status (e.g., expiration of the timeout timer). The first home node 806 (HN0) may receive snoop responses, in response to the snoop queries, indicating the status of the exclusive monitor and timeout timer (e.g., timeout register value), as described further with reference to FIG. 9. The first home node 806 (HN0) optionally performs operations to manage and/or clear the exclusive monitors and/or set or adjust the timeout registers for the request nodes (e.g., at the NIUs) in some implementations.

At 845, the first home node 806 (HN0) transmits a write data complete command. For example, the first home node 806 (HN0) transmits a write data complete command with a failure indication to the second request node 804 (RN1) that indicates data was not written to the first shared memory address based on and responsive determining not to write the data to the memory based on the outcome of the snoop coherency operations, which fails because the timeout timer has not yet expired. The second request node 804 (RN1) may then have to proceed with a another read command to access the data after the timeout and to rearm the corresponding exclusive monitor before trying (retrying) to write the data.

The write data complete command may indicate the data write for the first address of the first shared memory device (e.g., Mem0) is not successful and has failed based on and responsive to the write data exclusive command. Because the write data exclusive command from the second request node 804 (RN1) comes during the exclusivity period given to the first request node 802 (RN0) for the prior read data exclusive command, the write data exclusive command from the second request node 804 (RN1) cannot yet succeed as the any write data exclusive commands issued by the first request node 802 (RN0) before the expiration of the timeout timer at 865 are guaranteed to succeed. In such implementations, the first request node 802 (RN0) may respond to a snoop request of the snoop coherency operations to indicate a snoop failure or timeout timer has not yet expired.

Figure 11:
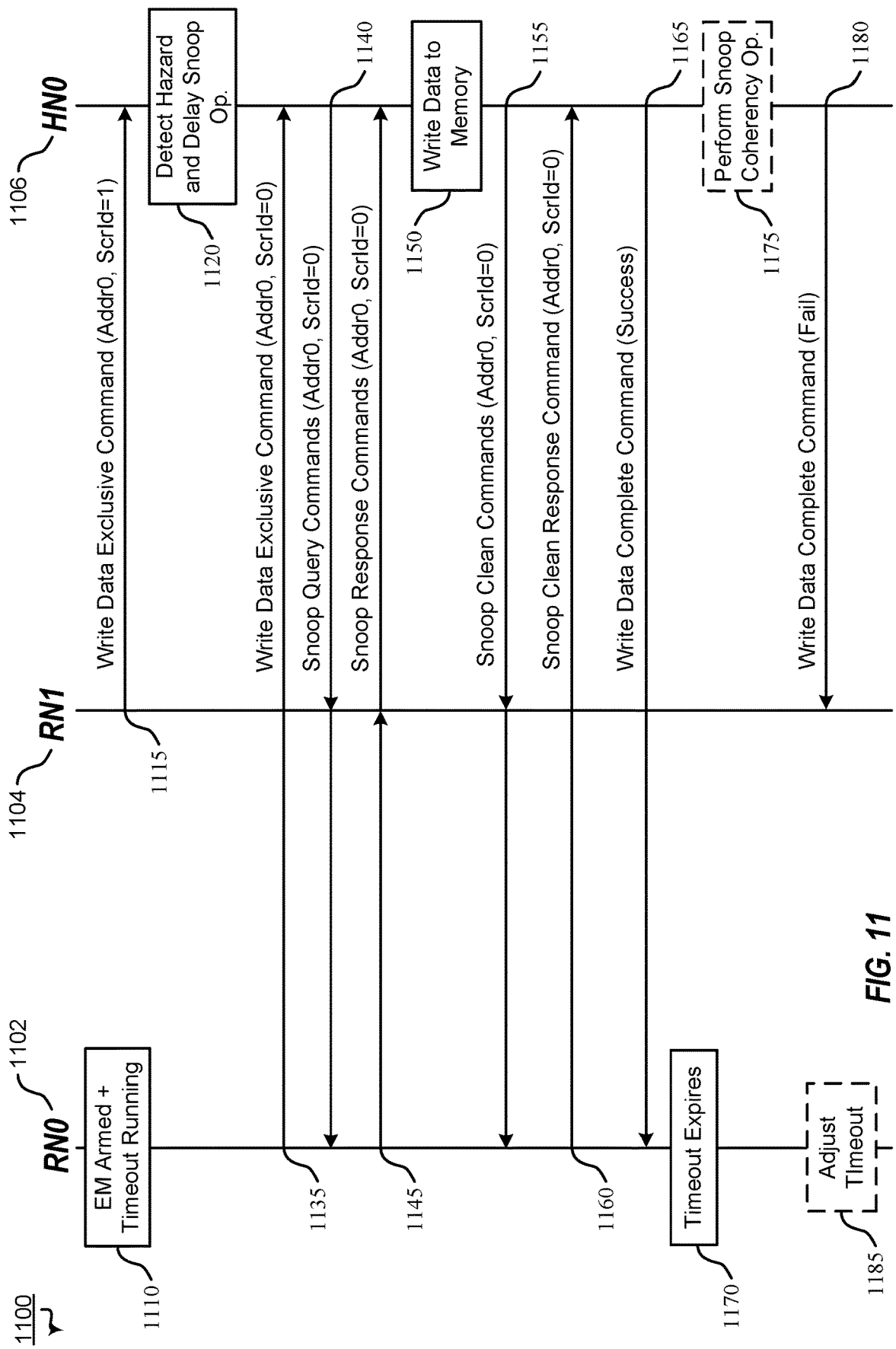
FIG. 11 is a flow diagram illustrating another example of enhanced exclusive access fairness operations according to some embodiments of the disclosure.

Although the example of FIG. 8 illustrates an example where the write data exclusive command from the second request node 804 (RN1) is failed immediately upon a determination that the timeout timer has not yet expired during performance of the snoop coherency operations at 840, in other implementations the write data exclusive command from the second request node 804 (RN1) may simply be placed in a queue or delayed by the first home node 806 until the expiration of the timeout timer at 865, and then after expiration of the timeout timer at 865 the write data exclusive command may be executed or attempted to be executed. Alternatively, the snoop operations may be delayed, as illustrated in FIG. 11, and not completed due to a lack of response or delay in response from the first request node 802 (RN0).

At 850, the first request node 802 (RN0) transmits a write data exclusive command. For example, the first request node 802 (RN0) transmits a second write data exclusive command to the first home node 806 (HN0) for the first address (addr0) of the first shared memory device (e.g., Mem0). To illustrate, the first request node 802 (RN0) may determine to send the second write data exclusive command for the first address based on determining that the corresponding second exclusive monitor (EM Mon0) at the first NIU 722 is armed for the first address. Additionally, the first request node 802 (RN0) may determine that the second write data exclusive command will succeed or is guaranteed to succeed based on the second write data exclusive command being sent during the timeout period and during operation of timeout timer (e.g., prior to expiration of the timeout timer at 865).

At 855, the first home node 806 (HN0) performs snoop coherency operations. For example, the first home node 806 (HN0) performs snoop coherency operations for the first address of the first shared memory device (e.g., Mem0) based on the write data exclusive command. To illustrate, the first home node 806 (HN0) may transmit one or more snoop messages to check on exclusive monitor status (e.g., arm or clear) and receive snoop responses indicating the status, as described further with reference to FIG. 9. The first home node 806 (HN0) optionally performs operations to manage and/or clear the exclusive monitors for the request nodes (e.g., at the NIUs) in some implementations.

At 860, the first home node 806 (HN0) write data to the memory. For example, the first home node 806 (HN0) writes the data to the first shared memory device (e.g., Mem0) at the first address based on the write data exclusive command. To illustrate, the first home node 806 (HN0) may communicate with the first shared memory device (e.g., Mem0) to write or modify the data at the first address. The first home node 806 (HN0) may write the data based on the snoop coherency operations performed at 855, as described with reference to the example of FIG. 9. To illustrate, the first home node 806 (HN0) may write the data or confirm writing of the data after successful completion of snoop coherency operations.

At 865, the timeout timer of the first request node 802 (RN0) expires. For example, the first request node 802 (RN0), such as a first NIU corresponding thereto, decrements a first timeout register for the first shared memory address to zero or increments the timeout register to threshold timeout value. To illustrate, as time passes after the first exclusive monitor is armed, a corresponding first timeout register is decremented until it reaches zero.

At 870, the first home node 806 (HN0) performs exclusive monitor management operations. For example, the first home node 806 (HN0) transmits one or more snoop clear messages to request nodes to clear exclusive monitors for the first address of the first shared memory device (e.g., Mem0) based on the writing the date to the memory. To illustrate, the first home node 806 (HN0) may transmit a first snoop clear message to the first request node 802 RN0) and a second snoop clear message to the second request node 804 (RN1).

At 875, the first home node 806 (HN0) transmits a write data complete command. For example, the first home node 806 (HN0) transmits a write data exclusive complete command to the second request node 8046 (RN1) that includes or indicates the data write for the first address of the first shared memory device (e.g., Mem0) is successful and complete based on and responsive to the write data exclusive command. Although the data is illustrated as being written or indicated as written prior to the write data complete command at 870 in the example of FIG. 8, in some other implementations the data may be written to the memory and/or confirmed as written to the second request node 804 (RN1) at 880 and contemporaneously with the transmission of the write data complete command or such may occur after transmission of the write data complete command at 880.

After 875, the device adjusts a starting value of timeout timer. For example, the RNs or the first home node 806 (HN0) adjusts a base timeout value or an adjusted timeout value for the exclusive access timeout register for the first request node 602 (RN0), and optionally for the second request node 604 (RN1). To illustrate, the first request node 802 (RN0) or the first home node 806 (HN0) adjusts a starting value of the exclusive access timeout register 760 for the first request node 802 (RN0) and for first shared memory address of the first shared memory device based on the second write data complete command indicating a success at 875. Although the expiration of the timeout timer is illustrated at 865 and as prior to completion of the second write data exclusive command at 875 in the example of FIG. 8, in some implementations, the timeout timer expires after completion of the second write data exclusive command at 875.

Figure 9:
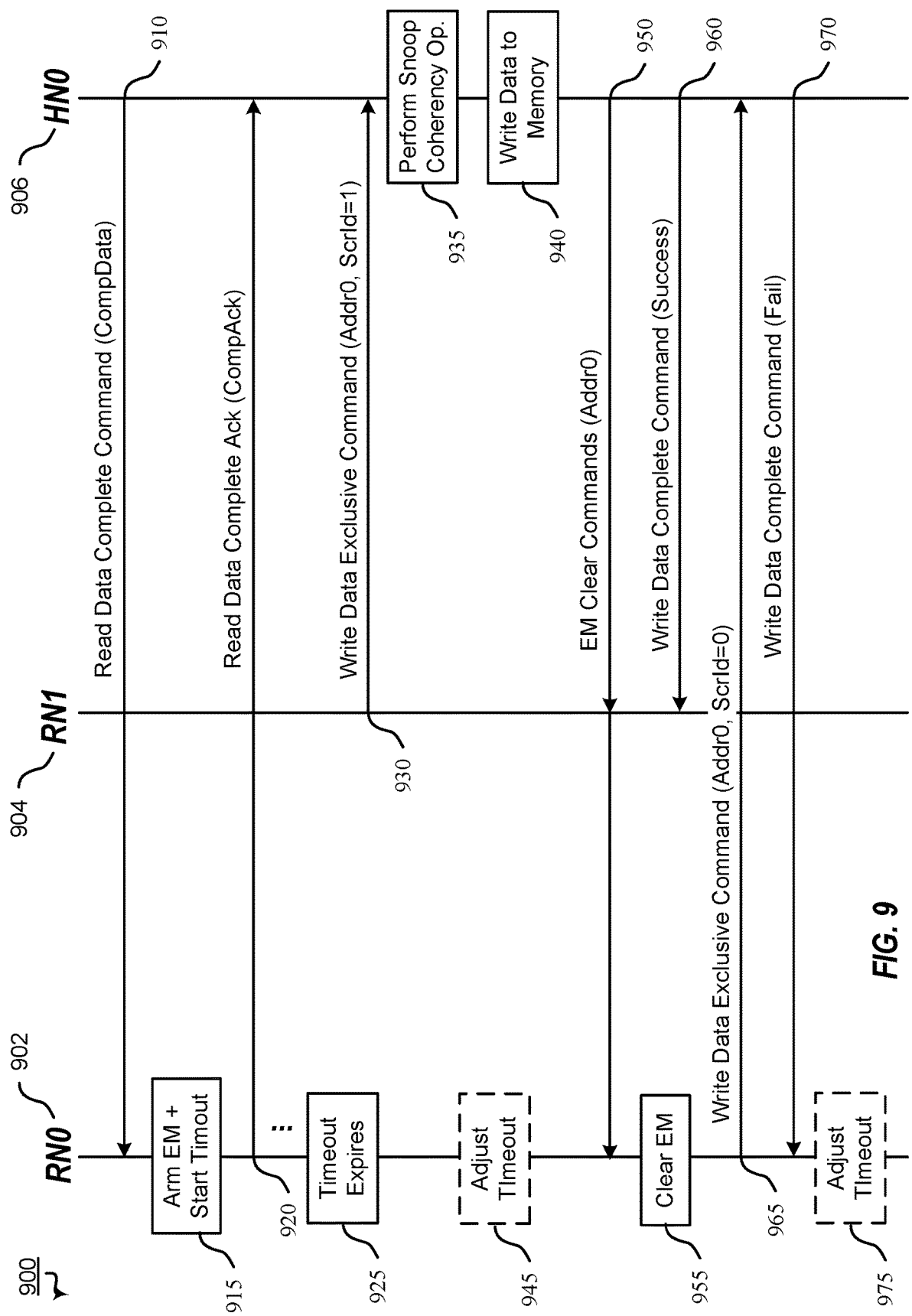
FIG. 9 is a flow diagram illustrating another example of enhanced exclusive access fairness operations according to some embodiments of the disclosure.

Referring to FIG. 9, FIG. 9 illustrates example read and write operations of one example of a SoC architecture according to some embodiments of the disclosure. FIG. 9 illustrates an example of access fairness operations of one or more components of a SoC, including RNs and HNs thereof, during an exclusive read and exclusive write operations. In FIG. 9, the SoC and components thereof may include to any of the memory or SoC components of FIGS. 1-5 and 7.

FIG. 9 is a flow diagram 900 illustrating operations for enhanced exclusive access fairness operations according to some embodiments of the disclosure. The enhanced exclusive access fairness operations may be performed by a SoC architecture as illustrated in FIG. 7, and including a more scalable EM layout with EMs on the CPU or RN side of the RN-to-memory interconnect. The EMs may be located in each CPU or in each NIU. The enhanced exclusive access fairness operations utilize an exclusive access delay or timeout period to ensure exclusive access for slower RNs. In the example of FIG. 9, an exclusive access delay or timeout period is implemented by a timeout register, such as the timeout register 760, and corresponds to an exclusive access delay or exclusivity duration.

As compared to the example of FIG. 8, where a write data exclusive command is issued during timeout period, in the example of FIG. 9, the write data exclusive command is issued after the timeout period and expiration of the timeout period. In such operations, the write data exclusive command is not guaranteed to succeed and competing (e.g., intervening) write data exclusive commands from other request nodes may succeed after expiration of the timeout period and prior to issuance or completion of the original write data exclusive command.

In FIG. 9, multiple request nodes (RN) and a host node (NH) are illustrated and perform the operations depicted. As illustrated in the example of FIG. 9, the diagram 900 includes a first request node 902 (RN0), a second request node 904 (RN1), and a first home node 906 (HN0). The first request node 902 (RN0) and the second request node 904 (RN1) may include or correspond to any of the CPUs 702 of FIG. 7 and/or the NIUs 704 of FIG. 7. For example, the first request node 902 (RN0) may include or correspond to the first CPU 712, the first NIU 722, or both, or to the first request node 802 (RN0) of FIG. 8, and the second request node 904 (RN1) may include or correspond to the second CPU 714, the second NIU 724, or both, or to the second request node 804 (RN1) of FIG. 8. The first home node 906 (HN0) may include or correspond to any of the home node monitors 708 of FIG. 7 or the first home node 806 (HN0) of FIG. 8. In some implementations, the operations may be performed by the memory controller 130 of the host 110 of FIG. 1, the memory controller 180 of the memory system 250 of FIG. 2, or one or more of the SoC components of FIG. 7.

Prior to the operations shown in FIG. 9, the first request node 902 (RN0) may transmit a read data exclusive command, which causes data to be written to the memory similar to the operations at 810 and 815 of FIG. 8. For example, the first request node 902 (RN0) transmits a first read data exclusive command to a first home node 906 (HN0) for a first address (addr0) of a first shared memory device (e.g., Mem0).

The read data exclusive command is a command to read data at a particular shared memory address and the requesting node is indicating that the data be tracked as exclusive. While the data is being tracked as exclusive other devices may be able to access the data at the shared memory address and optionally even write to the shared memory address (e.g., modify the data). However, if the data is changed by another node, all other nodes with may not be able to write the data at a later time without another read operation.

After receiving the first read data exclusive command, the first home node 906 (HN0) reads data from the memory. For example, the first home node 906 (HN0) reads data from the first shared memory device (e.g., Mem0) stored at the first address based on the read data exclusive command. To illustrate, the first home node 906 (HN0) communicates with the first shared memory device (e.g., Mem0) to obtain the data at the first address. As compared to FIG. 6, the first home node 906 (HN0) reads the data without arming an exclusive monitor, such as the RN-based exclusive monitor, because the exclusive monitors now reside on the other side of the interconnect 706, such as at the NIUs, as described with reference to the example of FIG. 7.

The operations include, at 910, transmitting, by the first home node 906 (HN0), a read data complete command for a prior read data exclusive command (not shown in FIG. 9). For example, the first home node 906 (HN0) transmits a read data complete command to the first request node 902 (RN0) that includes or indicates the data read from the first shared memory device (e.g., Mem0) stored at the first address based on and responsive to the read data exclusive command.

At 915, the first request node 902 (RN0) arms an exclusive monitor and starts a timeout timer. For example, the first request node 902 (RN0) arms a corresponding exclusive monitor associated with the first request node 902 (RN0) and for the first shared memory address based on receiving the read data complete command and starts the timeout timer by decrementing a timeout register corresponding to the armed exclusive monitor. To illustrate, the first request node 902 (RN0) arms an exclusive monitor (EM Mon0) at the first NIU 722 that corresponds to the first request node 902 (RN0) responsive to the read data complete command. The first request node 802 (RN0) sets a corresponding timeout register for the armed exclusive monitor (EM Mon0) at the first NIU 722 to a particular starting value (e.g., a base timeout value or a previously adjusted timeout value) and starts the timeout timer by decrementing the timeout register responsive to the read data complete command or arming the exclusive monitor.

At 920, the first request node 902 (RN0) transmits a read data acknowledgement. For example, the first request node 902 (RN0) transmits a first read data exclusive acknowledgement message to the first home node 906 (HN0) for the first read data exclusive command for the first shared memory address and responsive to arming the monitor and/or receiving the first read data complete message. The read data acknowledgement message may be sent responsive to arming of the exclusive monitor (EM Mon0) at the first NIU 722 and indicate that the exclusive monitor (EM Mon0) at the first NIU 722 has been successfully armed.

At 925, the timeout timer of the first request node 902 (RN0) expires. For example, the first request node 902 (RN0), such as a first NIU corresponding thereto, decrements a first timeout register for the first shared memory address to zero or increments the timeout register to threshold timeout value. To illustrate, as time passes after the first exclusive monitor is armed, a corresponding first timeout register is decremented until it reaches zero.

At 930, the second request node 904 (RN1) transmits a write data exclusive command. For example, the second request node 904 (RN1) transmits a write data exclusive command to the first home node 906 (HN0) for the first address (addr0) of the first shared memory device (e.g., Mem0). To illustrate, the second request node 904 (RN1) may determine to send the write data exclusive command for the first address based on determining that the corresponding second exclusive monitor EM Mon1) at the second NIU 724 is armed for the first address.

In some implementations, the second request node 904 (RN1) may transmit a read data exclusive command to the first home node 906 (HN0) for the first address (addr0) of the first shared memory device (e.g., Mem0) prior to transmitting the write data exclusive command at 960, similar to transmitting the read data exclusive command at 810 as in FIG. 8 and not shown in FIG. 9. Similar to the exclusive monitor and timeout timer operations of the first request node 902 (RN0), the second request node 904 (RN1) may also arm a corresponding exclusive monitor and start a timeout timer responsive to completion of the read data exclusive command from the second request node 904 (RN1), similar to the action of the first request node (RN0) at 915. The timeout timer for the second request node 904 (RN1) may be expired or may not be expired at 930 the second request node 904 (RN1) transmits the write data exclusive command. If it was not expired, success of the write data exclusive command transmitted by the second request node 904 (RN1) at 930 would be guaranteed, and based on prior expiration of the first timeout timer for the first request node 902 (RN0). If expired, the second request node 904 (RN1) is in a race with other nodes without any priority guarantees, similar to the current situation of the first request node 902 (RN0) after expiration of the first timeout timer at 925.

The starting values of the two timeout timers for the first and second request nodes 902 and 904 may be different or the same. For example, they may be set to a same or universal value for all RNs or a particular type of RN. As another example, each RN or type of RN may have a particular starting or default value based on position on the SoC and/or operational characteristics, e.g., speed, frequency, latency, etc. The values may also be adjusted differently based on the RN or type of RN. For example, RNs with higher starting value may have larger adjustments as compared to other RNs with lower starting values.

At 935, the first home node 906 (HN0) performs snoop coherency operations. For example, the first home node 906 (HN0) performs snoop coherency operations for the first address of the first shared memory device (e.g., Mem0) based on the write data exclusive command. To illustrate, the first home node 906 (HN0) may transmit one or more snoop messages to check on exclusive monitor status (e.g., arm or clear) and receive snoop responses indicating the status, as described further with reference to FIG. 10. The first home node 906 (HN0) optionally performs operations to manage and/or clear the exclusive monitors for the request nodes (e.g., at the NIUs) in some implementations.

At 940, the first home node 906 (HN0) write data to the memory. For example, the first home node 906 (HN0) writes the data to the first shared memory device (e.g., Mem0) at the first address based on the write data exclusive command. To illustrate, the first home node 906 (HN0) may communicate with the first shared memory device (e.g., Mem0) to write or modify the data at the first address. The first home node 906 (HN0) may write the data based on the snoop coherency operations performed at 965, as described with reference to the example of FIG. 10. To illustrate, the first home node 906 (HN0) may write the data or confirm writing of the data after successful completion of snoop coherency operations.

At 945, the device adjusts a starting value of timeout timer. For example, the RNs or the first home node 906 (HN0) adjusts a base timeout value or an adjusted timeout value for the exclusive access timeout register for the first request node 902 (RN0), and optionally for the second request node 904 (RN1). To illustrate, the first request node 902 (RN0) or the first home node 906 (HN0) adjusts a starting value of the exclusive access timeout register for the first request node 902 (RN0) and for first shared memory address of the first shared memory device based on expiration of the timeout timer at 925.

At 950, the first home node 906 (HN0) performs exclusive monitor management operations. For example, the first home node 906 (HN0) transmits one or more snoop clear messages to request nodes to clear exclusive monitors for the first address of the first shared memory device (e.g., Mem0) based on the writing the date to the memory. To illustrate, the first home node 906 (HN0) may transmit a first snoop clear message to the first request node 902 RN0) and a second snoop clear message to the second request node 904 (RN1), as illustrated in the example of FIG. 9.

At 955, the first request node 902 (RN0) clears the first exclusive monitor responsive to receiving the first snoop clear command at 950. The second request node 904 (RN1) also clears the second exclusive monitor responsive to receiving the second snoop clear command at 950. For example, the request nodes may receive the snoop clear commands and then instruct their corresponding NIU to clear the identified exclusive monitor. Alternatively, the request nodes may not clear or even receive the snoop clear command, and the attached NIU may clear the identified exclusive monitor based on receiving the snoop clear command from the first home node 906 (HN0) via the interconnect 706 of FIG. 7.

At 960, the first home node 906 (HN0) transmits a write data complete command. For example, the first home node 906 (HN0) transmits a write data exclusive complete command to the second request node 904 (RN1) that includes or indicates the data write for the first address of the first shared memory device (e.g., Mem0) is successful and complete based on and responsive to the write data exclusive command. Although the data is illustrated as being written or indicated as written prior to the write data complete command at 970 in the example of FIG. 9, in some other implementations the data may be written to the memory and/or confirmed as written to the second request node 904

(RN1) at 980 and contemporaneously with the transmission of the write data complete command or such may occur after transmission of the write data complete command at 980.

At 965, the first request node 902 (RN0) transmits a write data exclusive command. For example, the first request node 902 (RN0) transmits a second write data exclusive command to the first home node 906 (HN0) for the first address (addr0) of the first shared memory device (e.g., Mem0). To illustrate, the first request node 902 (RN0) may determine to send the write data exclusive command for the first address based on receiving the data and/or receiving the first read data complete command. Alternatively, in other implementations, the first request node 902 (RN0) may determine it is unable to transmit the second write data exclusive command to the first home node 906 (HN0) for the first address (addr0) of the first shared memory device (e.g., Mem0) because the corresponding exclusive monitor (EM Mon0) at the first NIU 722 is no longer armed and has a clear status for the first address.

After 965, the first home node 906 (HN0) does not write the data to the memory based on the second write data exclusive command. For example, the first home node 906 (HN0) determines to not write the data to the first shared memory address of the first shared memory device based on determining that the corresponding exclusive monitor (EM Mon0) for the first request node 902 (RN0) at the first NIU 722 is clear or not armed through second snoop or coherency operations, such as snoop or coherency operations similar to the operations at 840 or 855 of FIG. 8 and/or the operations at 1040 and 1045 of FIG. 10. The first home node 906 (HN0) may ignore the second write data exclusive command based on performing the snoop or coherency operations and determining that the monitor (EM Mon0) for the first request node 902 (RN0) at the first NIU 722 is clear or not armed and that the timeout timer has expired previously at 925.

At 970, the first home node 906 (HN0) transmits a write complete command. For example, the first home node 906 (HN0) transmits a write complete command with a fail indication to the first request node 902 (RN0) that indicates data was not written to the first shared memory address based on and responsive determining not to write the data to the memory. The first request node 902 (RN0) may then proceed with a read command to access the updated data and rearm the corresponding exclusive monitor, such as the read data exclusive command at 810 of FIG. 8, before trying (retrying) to write the data.

At 975, the device adjusts a starting value of timeout timer. For example, the RNs or the first home node 906 (HN0) adjusts a base timeout value or an adjusted timeout value for the exclusive access timeout register for the first request node 902 (RN0), and optionally for the second request node 904 (RN1). To illustrate, the first request node 902 (RN0) or the first home node 906 (HN0) adjusts a starting value of the exclusive access timeout register for the first request node 902 (RN0) and for first shared memory address of the first shared memory device based on the second write data complete command indicating a failure at 970. The starting value of the exclusive access timeout register for the first request node 902 (RN0) may be increased to increase the ability of the first request node 902 (RN0) to succeed in its future exclusive access requests.

Figure 10:
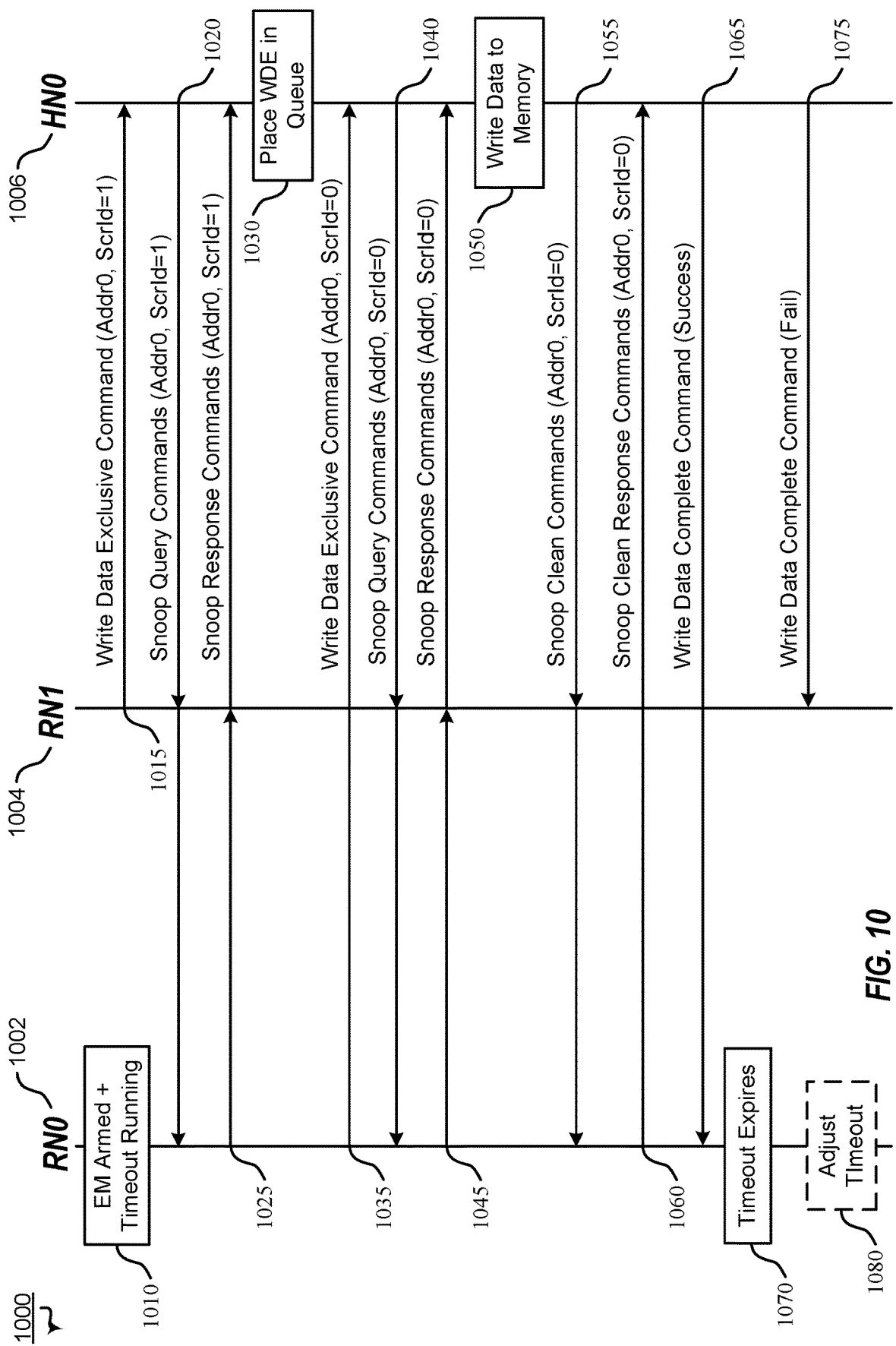
FIG. 10 is a flow diagram illustrating another example of enhanced exclusive access fairness operations according to some embodiments of the disclosure.

FIG. 10 is a flow diagram 1000 illustrating operations for enhanced exclusive access fairness operations according to some embodiments of the disclosure. The enhanced exclusive access fairness operations may be performed by a SoC architecture as illustrated in FIG. 7, and including a more scalable EM layout with EMs on the CPU or RN side of the CPU-to-memory interconnect. The EMs may be located in each CPU or in each NIU.

In FIG. 10, multiple request nodes (RN) and a host node (NH) are illustrated and perform the exclusive access fairness operations depicted. As illustrated in the example of FIG. 10, the diagram 1000 includes a first request node 1002 (RN0), a second request node 1004 (RN1), and a first home node 1006 (HN0). The first request node 1002 (RN0) and the second request node 1004 (RN1) may include or correspond to any of the CPUs 702 of FIG. 7 and/or the NIUs 704 of FIG. 7. For example, the first request node 1002 (RN0) may include or correspond to the first CPU 712, the first NIU 722, or both, or to the first request node 802 (RN0) of FIG. 8 or the first request node 902 (RN0) of FIG. 9, and the second request node 1004 (RN1) may include or correspond to the second CPU 714, the second NIU 724, or both, or to the second request node 804 (RN1) of FIG. 8 or the second request node 904 (RN1) of FIG. 9. The first home node 1006 (HN0) may include or correspond to any of the home node monitors 708 of FIG. 7, the first home node 806 (HN0) of FIG. 8, or the first home node 906 (HN0) of FIG. 9. In some implementations, the operations may be performed by the memory controller 130 of the host 110 of FIG. 1, the memory controller 180 of the memory system 250 of FIG. 2, or one or more of the SoC components of FIG. 7. The enhanced exclusive access fairness operations utilize an exclusive access delay or timeout period to ensure exclusive access for slower RNs. In the example of FIG. 10, an exclusive access delay or timeout period is implemented by a timeout register, such as the timeout register 760 of FIG. 7, and corresponds to an exclusive access delay or exclusivity duration.

As compared to the example of FIG. 9, where a write data exclusive command is not issued during a corresponding timeout period, in the example of FIG. 10, the write data exclusive command is issued during the corresponding timeout period and prior to expiration of the timeout period. In such operations, the write data exclusive command is guaranteed to succeed and competing (e.g., intervening) write data exclusive commands from other request nodes may not succeed until after expiration of the timeout period. In the example of FIG. 10, the success of the write data exclusive command is guaranteed by a HN storing other intervening or concurrent exclusive commands when the timeout timer is running and not expired. The HN may engage in snoop operations with the NIU to determine that a timeout timer is running and not expired for a prior exclusive access command and to store the other exclusive access commands.

At 1010, the first request node 1002 (RN0) has previously transmitted a read data exclusive command and has armed an exclusive monitor and started a timeout timer responsive to success of the read data exclusive command. For example, the first request node 1002 (RN0) transmits a read data exclusive command to the first home node 1006 (HN0) for the first address (addr0) of the first shared memory device (e.g., Mem0), similar to and as described with reference to 810 of FIG. 8. The first request node 1002 (RN0) arms a corresponding exclusive monitor at its NIU and starts a timeout timer, similar to and as described with reference to 825 of FIG. 8. To illustrate, the first request node 1002 (RN0) arms an exclusive monitor (EM Mon0) at the first NIU 722 that corresponds to the first request node 1002 (RN0) responsive to the read data complete command. The first request node 1002 (RN0) sets a corresponding timeout register for the armed exclusive monitor (EM Mon0) at the first NIU 722 to a particular starting value (e.g., a base timeout value or a previously adjusted timeout value) and starts the timeout timer by decrementing the timeout register responsive to the read data complete command or arming the exclusive monitor.

At 1015, the second request node 1004 (RN1) transmits a write data exclusive command. For example, the second request node 1004 (RN1) transmits a write data exclusive command to the first home node 1006 (HN0) for the first address (addr0) of the first shared memory device (e.g., Mem0), similar to and as described with reference to 835 of FIG. 8. To illustrate, the second request node 1004 (RN1) may determine to send the write data exclusive command for the first address based on determining that the corresponding second exclusive monitor (EM Mon1) at the second NIU 724 and for the first address (addr0) is armed.

After 1015, the first home node 1006 (HN0) performs snoop coherency operations similar to and as described with reference to 845 and 855 of FIG. 8 and with reference to 935 of FIG. 9. The snoop coherency operations may include the first home node 1006 HN(0) transmitting snoop query messages to one or more request nodes of the SoC to inquire into a status of an exclusive monitor, into a status of a timeout timer, or both. In the example of FIG. 10, the first home node 1006 (HN0) transmits, at 1020, a first snoop query command to the first request node 1002 (RN0) and a second snoop query command to the second request node 1004 (RN1). For example, the first home node 1006 (HN0) transmits a second snoop query command to the second request node 1004 (RN1) to inquire about a status of an exclusive monitor and timeout timer for the first address that corresponds to the second request node 1004 (RN1). To illustrate, as the exclusive monitor is now located at or near the second request node 1004 (RN1), such as in a corresponding second NIU (e.g., NIU 724), the first home node 1006 (HN0) may transmit a snoop message or other coherency message to determine a status or state of the second exclusive monitor (EM Mon1) for the first address and to determine a status or state of the second timeout timer for the first address.

At 1020, the request nodes transmit a snoop response command responsive to the snoop query commands. For example, the first request node 1002 (RN0) transmits a snoop response to the snoop query from the first home node 1006 (HN0) for the first address (addr0) of the first shared memory device (e.g., Mem0), and the second request node 1004 (RN1) transmits a snoop response to the snoop query from the first home node 1006 (HN0) for the first address (addr0) of the first shared memory device (e.g., Mem0). To illustrate, the first request node 1002 (RN0) may transmit a snoop response indicating the status of the second exclusive monitor (e.g., armed or clear) for the first shared address, which is armed in the example of FIG. 10, and indicating that status of the second timeout timer (e.g., expired or not expired) for the first shared address. To transmit the snoop response, the first request node 1002 (RN0) may cause the first NIU 722 to send the snoop response based on the status of the first exclusive monitor and/or the status of the first timeout timer. Alternatively, the first request node 1002 (RN0) may communicate with the first NIU 722 to determine the status of the first exclusive monitor and/or the first timeout timer, and then the first request node 1002 (RN0) may transmit, such as via the first NIU 722, the snoop response command based on the determined status.

At 1030, the first home node 1006 (HN0) stores the first write data exclusive command in a queue. For example, the first home node 1006 (HN0) may determine whether to store the first write data exclusive command in a delay or timeout queue based on the received snoop responses messages. To illustrate, because the snoop response message from the first request node 1002 (RN0) indicated that the timeout timer had not expired for the particular memory address in connection with a prior exclusive read command from the first request node 1002 (RN0), the first home node 1006 (HN0) stores the first write data exclusive command from the second request node 1004 (RN1) for the in the queue. Storing exclusive commands in the queue may enable the device to prevent command failures and ensure exclusive access to the first request node 1002 (RN0) during the timeout timer to promote exclusive access fairness among the RNs.

At 1035, the first request node 1002 (RN0) transmits a write data exclusive command. For example, the first request node 1002 (RN0) transmits a second write data exclusive command to the first home node 1006 (HN0) for the first address (addr0) of the first shared memory device (e.g., Mem0). To illustrate, the first request node 1002 (RN0) may determine to send the write data exclusive command for the first address based on receiving the data and/or receiving the first read data complete command.

After 1035, the first home node 1006 (HN0) performs second snoop coherency operations for the second write data exclusive command similar to the snoop coherency operations described above for the first write data exclusive command. The second snoop coherency operations may include the first home node 1006 HN(0) transmitting second snoop query messages to one or more request nodes of the SoC to inquire into a status of an exclusive monitor, into a status of a timeout timer, or both. In the example of FIG. 10, the first home node 1006 (HN0) transmits, at 1040, a third snoop query command to the first request node 1002 (RN0) and a fourth snoop query command to the second request node 1004 (RN1). For example, the first home node 1006 (HN0) transmits a fourth snoop query command to the second request node 1004 (RN1) to inquire about a status of an exclusive monitor and a timeout timer for the first address that corresponds to the second request node 1004 (RN1). To illustrate, as the exclusive monitor is now located at or near the second request node 1004 (RN1), such as in a corresponding second NIU (e.g., NIU 724), the first home node 1006 (HN0) may transmit a snoop message or other coherency message to determine a status or state of the second exclusive monitor (EM Mon1) for the first address and to determine a status or state of the second timeout timer for the first address.

At 1045, one or more request nodes transmit a snoop response command responsive to the snoop query messages from the first home node 1006 HN(0). For example, the first request node 1002 (RN0) transmits a snoop response to the snoop query from the first home node 1006 (HN0) for the first address (addr0) of the first shared memory device (e.g., Mem0), and the second request node 1004 (RN1) transmits a snoop response to the snoop query from the first home node 1006 (HN0) for the first address (addr0) of the first shared memory device (e.g., Mem0). To illustrate, the first request node 1002 (RN0) may transmit a snoop response indicating the status of the first exclusive monitor (e.g., armed or clear) for the first shared address, which is armed in the example of FIG. 10, and indicating that status of the first timeout timer (e.g., expired or not expired) for the first shared address, which is not expired in the example of FIG. 10. To transmit the snoop response, the first request node 1002 (RN0) may cause the first NIU 722 to send the snoop response based on the status of the first exclusive monitor and/or the first of the second timeout timer. Alternatively, the first request node 1002 (RN0) may communicate with the first NIU 722 to determine the status of the first exclusive monitor and/or the first timeout timer, and then the first request node 1002 (RN0) may transmit, such as via the first NIU 722, the snoop response command based on the determined status.

At 1050, the first home node 1006 (HN0) write data to the memory. For example, the first home node 1006 (HN0) writes the data to the first shared memory device (e.g., Mem0) at the first address based on the write data exclusive command and responsive to the snoop response command. To illustrate, the first home node 1006 (HN0) may write the data based on the snoop response command indicating that the second exclusive monitor of the second NIU 724 is armed. The armed status for the second exclusive monitor may indicate that the data received by the second request node 1004 (RN1) in a read command prior to the write command is current or coherent (i.e., the data at the first address has not changed).

After writing the data at 1050, the first home node 1006 (HN0) performs snoop coherency operations similar to and as described with reference to 870 of FIG. 8 or 950 of FIG. 9 to update the status of (e.g., clear) the exclusive monitors. In the example of FIG. 10, at 1055, the first home node 1006 (HN0) transmits a first snoop clean command to the first request node 1002 (RN0), and transmits a second snoop clean command to the second request node 1004 (RN1). To illustrate, the second snoop clean commands may indicate to clear corresponding exclusive monitors for the first address based on the first home node 1006 (HN0) writing the data to the first shared memory device at the first shared address.

Although two snoop clear messages are illustrated in the example of FIG. 10, the device may send more or fewer snoop clear messages. For example, the first home node 1006 (HN0) may send snoop clear messages to each request node and/or NIU. As another example, the first home node 1006 (HN0) may only send snoop clear messages to each request node and/or NIU which has requested or recently requested the data from the address.

After 1055, the first request node 1002 (RN0) clears the first exclusive monitor responsive to receiving the first snoop clear command, and the second request node 1004 (RN1) clears the second exclusive monitor responsive to receiving the second snoop clear command. For example, the request nodes may receive the snoop clear commands and then instruct their corresponding NIU to clear the identified exclusive monitor. Alternatively, the request nodes may not clear or even receive the snoop clear command, and the attached NIU may clear the identified exclusive monitor based on receiving the snoop clear command from the first home node 1006 (HN0) via the interconnect 706 of FIG. 7.

After clearing the corresponding exclusive monitors, the request nodes may transmit snoop clean response commands to indicate the updated status of the exclusive monitors at 1060. In the example of FIG. 10, the first request node 1002 (RN0) transmits a first snoop clean response command, and the second request node 1004 (RN1) transmits a second snoop clean response command. Alternatively, the attached NIU may transmit snoop clean response commands responsive to clearing the exclusive monitor or changing a status thereof, and to indicate the updated status of the exclusive monitors to the first home node 1006 (HN0) which sent the snoop clear commands.

At 1065, the first home node 1006 (HN0) transmits a write data complete command. For example, the first home node 1006 (HN0) transmits a write data exclusive complete command to the first request node 1002 (RN0) that includes or indicates the data write for the first address of the first shared memory device (e.g., Mem0) is successful and complete based on, and optionally responsive to, the second write data exclusive command. Although the data is illustrated as being written or indicated as written prior to the write data complete command at 1060 in the example of FIG. 10, in some other implementations the data may be written to the memory and/or confirmed as written to the first request node 1002 (RN0) at 1060 and contemporaneously with the transmission of the write data complete command or such may occur after transmission of the write data complete command at 1060.

At 1070, the timeout timer of the first request node 1002 (RN0) expires. For example, the first request node 1002 (RN0), such as a first NIU corresponding thereto, decrements a first timeout register for the first shared memory address to zero or increments the timeout register to threshold timeout value. To illustrate, as time passes after the first exclusive monitor is armed, a corresponding first timeout register is decremented until it reaches zero.

After 1065 or 1070, the first home node 1006 (HN0) transmits a write complete command at 1075. For example, the first home node 1006 (HN0) transmits a write complete command with a fail indication to the second request node 1004 (RN1) that indicates data was not written to the first shared memory address based on and responsive determining not to write the data to the memory for the write data exclusive command. The second request node 1004 (RN1) may then proceed with a read command to access the updated data and rearm the corresponding exclusive monitor, such as the read data exclusive command at 810 of FIG. 8, before trying (retrying) to write the data. The first home node 1006 (HN0) may process the queued write data exclusive command from the second request node 1004 (RN1) after completion of the second write data command from the first request node 1002 (RN0), and may determine a failure for the unqueued write data exclusive command responsive to completion of the second write data exclusive command at 1065 or responsive to subsequent snoop coherency operations for the unqueued write data exclusive command, similar to the snoop coherency operations for the second write data exclusive command at 1040 and 1045.

At or after 1075, the first home node 1006 (HN0) does not write the data to the memory based on the write data exclusive command from the second request node 1004 (RN1). For example, the first home node 1006 (HN0) determines to not write the data to the first shared memory address of the first shared memory device based on determining that the corresponding exclusive monitor (EM Mon0) for the second request node 1004 (RN1) at the second NIU 724 is clear or not armed through second snoop or coherency operations, such as snoop or coherency operations similar to the operations at 840 or 855 of FIG. 8 and/or the operations at 1015 and 1020 of FIG. 10. The first home node 1006 (HN0) may ignore the write data exclusive command based on performing the snoop or coherency operations and determining that the monitor (EM Mon1) for the second request node 1004 (RN1) at the second NIU 724 is clear or not armed.

At 1080, the device adjusts a starting value of timeout timer. For example, the first request node 1002 (RN0) or the first home node 1006 (HN0) adjusts a base timeout value or an adjusted timeout value for the exclusive access timeout register for the first request node 1002 (RN0), and optionally for the second request node 1004 (RN1). To illustrate, the first request node 1002 (RN0) or the first home node 1006

(HN0) adjusts a starting value of the exclusive access timeout register for the first request node 1002 (RN0) and for first shared memory address of the first shared memory device based on the second write data complete command indicating a success at 1065. The starting value of the exclusive access timeout register for the first request node 1002 (RN0) may be decreased to decrease the ability of the first request node 1002 (RN0) to succeed in its future exclusive access requests. As another illustration, the second request node 1004 (RN1) or the first home node 1006 (HN0) adjusts a starting value of the exclusive access timeout register for the second request node 1004 (RN1) and for first shared memory address of the first shared memory device based on the first write data complete command indicating a failure at 1075. The starting value of the exclusive access timeout register for the second request node 1004 (RN1) may be increased to increase the ability of the second request node 1004 (RN1) to succeed in its future exclusive access requests.

FIG. 11 is a flow diagram 1100 illustrating operations for enhanced exclusive access fairness operations according to some embodiments of the disclosure. The enhanced exclusive access fairness operations may be performed by a SoC architecture as illustrated in FIG. 7, and including a more scalable EM layout with EMs on the CPU or RN side of the CPU-to-memory interconnect. The EMs may be located in each CPU or in each NIU.

In FIG. 11, multiple request nodes (RN) and a host node (NH) are illustrated and perform the exclusive access fairness operations depicted. As illustrated in the example of FIG. 11, the diagram 1100 includes a first request node 1102 (RN0), a second request node 1104 (RN1), and a first home node 1106 (HN0). The first request node 1102 (RN0) and the second request node 1104 (RN1) may include or correspond to any of the CPUs 702 of FIG. 7 and/or the NIUs 704 of FIG. 7. For example, the first request node 1102 (RN0) may include or correspond to the first CPU 712, the first NIU 722, or both, or to the first request node 802 (RN0) of FIG. 8, the first request node 902 (RN0) of FIG. 9, or the first request node 1002 (RN0) of FIG. 10, and the second request node 1104 (RN1) may include or correspond to the second CPU 714, the second NIU 724, or both, or to the second request node 804 (RN1) of FIG. 8, the second request node 904 (RN1) of FIG. 9, or the second request node 1004 (RN1) of FIG. 10. The first home node 1106 (HN0) may include or correspond to any of the home node monitors 708 of FIG. 7, or the first home node 806 (HN0) of FIG. 8, the first home node 906 (HN0) of FIG. 9, or the first home node 1006 (HN0) of FIG. 10. In some implementations, the operations may be performed by the memory controller 130 of the host 110 of FIG. 1, the memory controller 180 of the memory system 250 of FIG. 2, or one or more of the SoC components of FIG. 7. The enhanced exclusive access fairness operations utilize an exclusive access delay or timeout period to ensure exclusive access for slower RNs. In the example of FIG. 11, an exclusive access delay or timeout period is implemented by a timeout register, such as the timeout register 760 of FIG. 7, and corresponds to an exclusive access delay or exclusivity duration.

As compared to the example of FIG. 10, where concurrent exclusive commands are stored at the HN during the timeout period, in the example of FIG. 11 snoop responses for concurrent exclusive commands that are received by the RU/NIU during the timeout period are delayed until after expiration of the timeout period. In such operations, the write data exclusive command is guaranteed to succeed and competing (e.g., intervening) write data exclusive commands from other request nodes may not succeed until after expiration of the timeout period. In the example of FIG. 11, the success of the write data exclusive command is guaranteed by a HN delaying snoop operations due to a prior read command, and when the timeout timer is running and not expired. In alternative aspects, a NIU may delay a snoop response to the HN when its timeout timer is running and not expired.

At 1110, the first request node 1102 (RN0) has previously transmitted a read data exclusive command and has armed an exclusive monitor and started a timeout timer responsive to success of the read data exclusive command. For example, the first request node 1102 (RN0) transmits a read data exclusive command to the first home node 1106 (HN0) for the first address (addr0) of the first shared memory device (e.g., Mem0), similar to and as described with reference to 810 of FIG. 8. The first request node 1102 (RN0) arms a corresponding exclusive monitor at its NIU and starts a timeout timer, similar to and as described with reference to 825 of FIG. 8. To illustrate, the first request node 1102 (RN0) arms an exclusive monitor (EM Mon0) at the first NIU 722 that corresponds to the first request node 1102 (RN0) responsive to the read data complete command. The first request node 1102 (RN0) sets a corresponding timeout register for the armed exclusive monitor (EM Mon0) at the first NIU 722 to a particular starting value (e.g., a base timeout value or a previously adjusted timeout value) and starts the timeout timer by decrementing the timeout register responsive to the read data complete command or arming the exclusive monitor.

At 1115, the second request node 1104 (RN1) transmits a write data exclusive command. For example, the second request node 1104 (RN1) transmits a write data exclusive command to the first home node 1106 (HN0) for the first address (addr0) of the first shared memory device (e.g., Mem0), similar to and as described with reference to 835 of FIG. 8. To illustrate, the second request node 1104 (RN1) may determine to send the write data exclusive command for the first address based on determining that the corresponding second exclusive monitor (EM Mon1) at the second NIU 724 and for the first address (addr0) is armed.

After 1115, the first home node 1106 (HN0) determines whether to perform snoop coherency operations similar to and as described with reference to 845 and 855 of FIG. 8 and with reference to 935 of FIG. 9 based on the received write data exclusive command from the second request node 1104 (RN1). The snoop coherency operations may include the first home node 1106 HN(0) transmitting snoop query messages to one or more request nodes of the SoC to inquire into a status of an exclusive monitor, into a status of a timeout timer, or both. In the example of FIG. 11, the first home node 1106 (HN0) detects, at 1120, a hazard or conflict between the prior the received read data exclusive command from the first request node 1102 (RN0) (not shown if FIG. 11) which armed the exclusive monitor and started the timeout timer and the received write data exclusive command from the second request node 1104 (RN1). For example, the first home node 1106 (HN0) detects that the first request node 1102 (RN0) still has an active entry in a local directory and has the line or exclusivity for the particular shared memory address. The first request node 1102 (RN0) may determine to queue the write data exclusive command and delay snoop coherency operations for the write data exclusive command until a complete acknowledgement message is generated for the read data exclusive command from the first request node 1102 (RN0), for example is until a complete acknowledgement message is generated for a corresponding write data exclusive command from the first request node 1102 (RN0) that matches the address of the read data exclusive command. As described with reference to the previous examples above, the complete acknowledgement message for the read data exclusive command may be generated and sent in connection with successful completion of the corresponding write data exclusive command from the first request node 1102 (RN0) or based on expiration of the timeout timer started responsive to the read data exclusive command.

After detecting the hazard or conflict at 1120, the first home node 1106 (HN0) determines to delay the snoop coherency operations for the write data exclusive command from the second request node 1104 (RN1). For example, the first home node 1106 (HN0) does not transmit snoop query commands to the request the request nodes regarding a status of exclusive monitors or timeout timers of other request nodes.

At 1135, the first request node 1102 (RN0) transmits a write data exclusive command. For example, the first request node 1102 (RN0) transmits a second write data exclusive command to the first home node 1106 (HN0) for the first address (addr0) of the first shared memory device (e.g., Mem0). To illustrate, the first request node 1102 (RN0) may determine to send the write data exclusive command for the first address based on receiving the data and/or receiving the first read data complete command.

After 1135, the first home node 1106 (HN0) performs snoop coherency operations for the second write data exclusive command. The second snoop coherency operations may include the first home node 1106 HN(0) transmitting second snoop query messages to one or more request nodes of the SoC to inquire into a status of an exclusive monitor, into a status of a timeout timer, or both. In the example of FIG. 11, the first home node 1106 (HN0) transmits, at 1140, a third snoop query command to the first request node 1102 (RN0) and a fourth snoop query command to the second request node 1104 (RN1). For example, the first home node 1106 (HN0) transmits a fourth snoop query command to the second request node 1104 (RN1) to inquire about a status of an exclusive monitor and a timeout timer for the first address that corresponds to the second request node 1104 (RN1). To illustrate, as the exclusive monitor is now located at or near the second request node 1104 (RN1), such as in a corresponding second NIU (e.g., NIU 724), the first home node 1106 (HN0) may transmit a snoop message or other coherency message to determine a status or state of the second exclusive monitor (EM Mon1) for the first address and to determine a status or state of the second timeout timer for the first address.

At 1145, one or more request nodes transmit a snoop response command responsive to the snoop query messages from the first home node 1106 HN(0). For example, the first request node 1102 (RN0) transmits a snoop response to the snoop query from the first home node 1106 (HN0) for the first address (addr0) of the first shared memory device (e.g., Mem0), and the second request node 1104 (RN1) transmits a snoop response to the snoop query from the first home node 1106 (HN0) for the first address (addr0) of the first shared memory device (e.g., Mem0). To illustrate, the first request node 1102 (RN0) may transmit a snoop response indicating the status of the first exclusive monitor (e.g., armed or clear) for the first shared address, which is armed in the example of FIG. 11, and indicating that status of the first timeout timer (e.g., expired or not expired) for the first shared address, which is not expired in the example of FIG. 11. To transmit the snoop response, the first request node 1102 (RN0) may cause the first NIU 722 to send the snoop response based on the status of the first exclusive monitor and/or the first of the second timeout timer. Alternatively, the first request node 1102 (RN0) may communicate with the first NIU 722 to determine the status of the first exclusive monitor and/or the first timeout timer, and then the first request node 1102 (RN0) may transmit, such as via the first NIU 722, the snoop response command based on the determined status.

At 1150, the first home node 1106 (HN0) write data to the memory. For example, the first home node 1106 (HN0) writes the data to the first shared memory device (e.g., Mem0) at the first address based on the write data exclusive command and responsive to the snoop response command. To illustrate, the first home node 1106 (HN0) may write the data based on the snoop response command indicating that the second exclusive monitor of the second NIU 724 is armed. The armed status for the second exclusive monitor may indicate that the data received by the second request node 1104 (RN1) in a read command prior to the write command is current or coherent (i.e., the data at the first address has not changed).

After writing the data at 1150, the first home node 1106 (HN0) performs snoop coherency operations similar to and as described with reference to 870 of FIG. 8 or 950 of FIG. 9 to update the status of (e.g., clear) the exclusive monitors. In the example of FIG. 11, at 1155, the first home node 1106 (HN0) transmits a first snoop clean command to the first request node 1102 (RN0), and transmits a second snoop clean command to the second request node 1104 (RN1). To illustrate, the second snoop clean commands may indicate to clear corresponding exclusive monitors for the first address based on the first home node 1106 (HN0) writing the data to the first shared memory device at the first shared address.

Although two snoop clear messages are illustrated in the example of FIG. 11, the device may send more or fewer snoop clear messages. For example, the first home node 1106 (HN0) may send snoop clear messages to each request node and/or NIU. As another example, the first home node 1106 (HN0) may only send snoop clear messages to each request node and/or NIU which has requested or recently requested the data from the address.

After 1155, the first request node 1102 (RN0) clears the first exclusive monitor responsive to receiving the first snoop clear command, and the second request node 1104 (RN1) clears the second exclusive monitor responsive to receiving the second snoop clear command. For example, the request nodes may receive the snoop clear commands and then instruct their corresponding NIU to clear the identified exclusive monitor. Alternatively, the request nodes may not clear or even receive the snoop clear command, and the attached NIU may clear the identified exclusive monitor based on receiving the snoop clear command from the first home node 1106 (HN0) via the interconnect 706 of FIG. 7.

After clearing the corresponding exclusive monitors, the request nodes may transmit snoop clean response commands to indicate the updated status of the exclusive monitors at 1160. In the example of FIG. 11, the first request node 1102 (RN0) transmits a first snoop clean response command, and the second request node 1104 (RN1) transmits a second snoop clean response command. Alternatively, the attached NIU may transmit snoop clean response commands responsive to clearing the exclusive monitor or changing a status thereof, and to indicate the updated status of the exclusive monitors to the first home node 1106 (HN0) which sent the snoop clear commands.

At 1165, the first home node 1106 (HN0) transmits a write data complete command. For example, the first home node 1106 (HN0) transmits a write data exclusive complete command to the first request node 1102 (RN0) that includes or indicates the data write for the first address of the first shared memory device (e.g., Mem0) is successful and complete based on, and optionally responsive to, the write data exclusive command. Although the data is illustrated as being written or indicated as written prior to the write data complete command at 1160 in the example of FIG. 11, in some other implementations the data may be written to the memory and/or confirmed as written to the first request node 1102 (RN0) at 1160 and contemporaneously with the transmission of the write data complete command or such may occur after transmission of the write data complete command at 1160.

At 1170, the timeout timer of the first request node 1102 (RN0) expires. For example, the first request node 1102 (RN0), such as a first NIU corresponding thereto, decrements a first timeout register for the first shared memory address to zero or increments the timeout register to threshold timeout value. To illustrate, as time passes after the first exclusive monitor is armed, a corresponding first timeout register is decremented until it reaches zero.

At 1175, the first request node (HN0) optionally performs second snoop coherency operations for the write data exclusive command after completion of the second write data exclusive command at 1165 or after expiration of timeout timer at 1170. The second snoop coherency operations may include the first home node 1106 HN(0) transmitting second snoop query messages to one or more request nodes of the SoC to inquire into a status of an exclusive monitor, into a status of a timeout timer, or both. For example, the first home node 1106 (HN0) may transmit snoop query commands and/or snoop clear commands to the request nodes to inquire into one or more statuses thereof and/or to clear monitors and timeout timers.

After 1175, the first home node 1106 (HN0) does not write the data to the memory based on the write data exclusive command. For example, the first home node 1106 (HN0) determines to not write the data to the first shared memory address of the first shared memory device based on determining that the corresponding exclusive monitor (EM Mon0) for the second request node 1104 (RN1) at the second NIU 724 is clear or not armed through second snoop or coherency operations, such as snoop or coherency operations similar to the operations at 840 or 855 of FIG. 8 and/or the operations at 1140 and 1145 of FIG. 11. The first home node 1106 (HN0) may ignore the write data exclusive command based on performing the snoop or coherency operations and determining that the monitor (EM Mon0) for the first request node 1102 (RN0) at the first NIU 722 is clear or not armed.

At 1180, the first home node 1106 (HN0) transmits a write complete command. For example, the first home node 1106 (HN0) transmits a write complete command with a fail indication to the second request node 1104 (RN1) that indicates data was not written to the first shared memory address based on and responsive determining not to write the data to the memory. The first request node 1102 (RN0) may then proceed with a read command to access the updated data and rearm the corresponding exclusive monitor, such as the read data exclusive command at 811 of FIG. 8, before trying (retrying) to write the data. The write complete command with the fail indication to the first request node 1102 (RN0) may be sent responsive to one or more of completion of the second write data exclusive command at 1165, expiration of timeout timer at 1170, or completion of the snoop coherency operations at 1175.

At 1185, the device adjusts a starting value of timeout timer. For example, the first request node 1102 (RN0) or the first home node 1106 (HN0) adjusts a base timeout value or an adjusted timeout value for the exclusive access timeout register for the first request node 1102 (RN0), and optionally for the second request node 1104 (RN1). To illustrate, the first request node 1102 (RN0) or the first home node 1106 (HN0) adjusts a starting value of the exclusive access timeout register for the first request node 1102 (RN0) and for first shared memory address of the first shared memory device based on the second write data complete command indicating a success at 1165. The starting value of the exclusive access timeout register for the first request node 1102 (RN0) may be decreased to decrease the ability of the first request node 1102 (RN0) to succeed in its future exclusive access requests. As another illustration, the second request node 1104 (RN1) or the first home node 1106 (HN0) adjusts a starting value of the exclusive access timeout register for the second request node 1104 (RN1) and for first shared memory address of the first shared memory device based on the first write data complete command indicating a failure at 1180. The starting value of the exclusive access timeout register for the second request node 1104 (RN1) may be increased to increase the ability of the second request node 1104 (RN1) to succeed in its future exclusive access requests.

Although the examples of FIGS. 5-11 have been described with reference to exclusive monitors or exclusive monitors which track exclusive accesses to memory regions marked as shared, the concepts and operations of FIGS. 5-11 can be applied to local exclusive monitors or exclusive monitors which track exclusive accesses to dedicated memory regions (e.g., non-shared memory regions). For example, in some implementations, local exclusive monitors may be moved from the HNs to the RNs (e.g., associated NIUs) to keep all of the exclusive monitors on the CPU side of the interconnect. In such examples, the local exclusive monitors may function the same as conventional local monitors and the HNs may use snoop operations to check on the status of the local exclusive monitors as described with reference to FIGS. 8-11. Alternative, local exclusive monitors may not be used if there is no dedicated memory for a particular CPU, or conventional placement of local exclusive monitors may be used and the local exclusive monitors may remain in the HNs. Local exclusive monitors do not face the same scaling issues as exclusive monitors or exclusive monitors for shared memory addresses.

Accordingly, the relocation of EM into the NIUs provides for a large area savings for EMs, while still maintaining backwards compatibility with write data exclusive and read data exclusive commands for the SoC. The relocation of EM into the NIUs does not provide a timing impact for operations of the SoC and this architecture is compatible with multi-die and chiplet SoCs. Also, the die-to-die interfaces are not impacted.

In some aspects, the EM fairness mechanism at a NoC includes a fairness scheme for synchronizing CPU and IO exclusives on IO-Coherent workloads. For example, a CPU and IO performs N atomic updates to a shared "cacheable" variable (y) at the CPU using an LDX-STX sequence. The CPU uses an internal local EM (ILEM), and the IO uses EM of its NIU. The base timeout times (tout) for the timeout timers for the CPU and the IO are programmed appropriately at their NIUs. The fairness scheme may operate to have a NH block an address from the CPU. For example, during operation the CPU and the IO can issue LDX's in parallel. The CPU's LDX is not propagated to the NoC by the ILEM, such as based on the timeout timer. The IO's successful LDX arms an EM at its NIU which starts the timeout timer at the NIU. The HN blocks this address for usage by CPU until a STX to the matching address from the LDX of the IO is received within the timeout timer. After the timeout timer is started, but prior to expiration, the CPU issues an exclusive command (e.g., MkRU_Excl*) to the same address. The HN detects a hazard, and the exclusive command from the CPU is queued at HN command buffer because the timeout timer for the IO has started and not yet expired.

The IO the issues a STX before expiration of the timeout timer, and the IO's STX is completed successfully. The CPU's exclusive command is next in line. However, the CPU's exclusive command proceeds after the IO's STX is completed, and a fail response is sent to CPU as the IO has previously updated the shared variable (y). The CPU then retries the sequence with another LDX. The process continues until the CPU and IO performs N atomic updates to the shared variable (y). For example, if the CPU issues another exclusive command for the shared variable (y) with no pending exclusives at the HN, it will be processed immediately, and the STX of CPU will be successful and the data is updated within the cache of the CPU.

In some aspects, the EM fairness mechanism at a NoC includes another fairness scheme for synchronizing CPU and IO exclusives on non-cacheable/device-type workloads. For example, the CPU and the IO performs N atomic updates to a shared "non-cacheable" variable (y) using an LDX-STX sequence. The CPU and the IO each use their own separate EMs from their own separate NIUs as these exclusives are propagated to a NoC. The fairness scheme may operate to have a HN block an address from the CPU. For example, during operation the CPU and the IO can issue LDX's in parallel. In some scenarios where the IO's LDX comes or gets processed first, the fairness scheme works as follows to reserve the address for the IO. To illustrate, the LDX issued by the IO for the shared variable (y) is received and processed by the HN, which causes the NIU of the IO to arm its EM and start the timeout timer. When the LDX issued by the CPU for the shared variable (y) reaches the HN, the HN detects a hazard due to the previous LDX for the shared variable (y) by the IO. For example, a snoop or coherency operation by the NH determines the monitor is armed and the timeout timer is running and not expired. The HN does not arm an EM or start a timer for the CPU at its corresponding NIU. The HN essentially blocks the memory address for the shared variable (y) until expiration of the timeout timer. The IO then later issues a STX within the timeout period which is completed successfully. The CPU's LDX is next in line, so the LDX proceeds to execute the CPU's LDX. The CPU reads the updated value from the location and arms its EM.

The CPU may then perform an STX. The process may continue until the CPU and/or IO perform N atomic updates to shared variable (y). For example, if the IO issues an another LDX when CPU's LDX is in progress, the IO's LDX will wait in the command buffer until the second timeout timer for the CPU is finished or until the CPU has performed STX. Because the above and disclosed schemes serialize LDX-STX pairs like an atomic operation, they will provide better fairness so no cores will fail in case of an exclusive operation.

Figure 12:
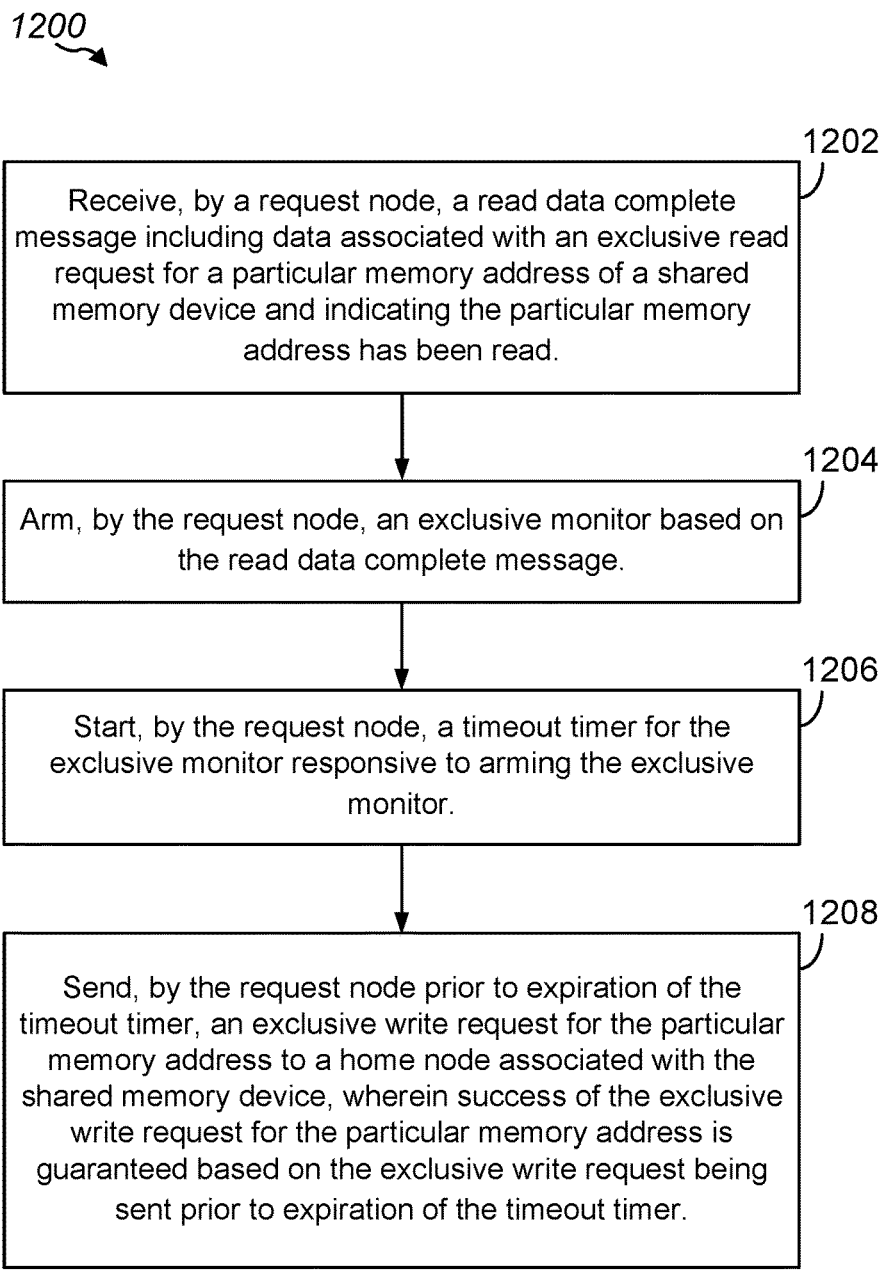
FIG. 12 is a flow chart illustrating an example of a method for enhanced exclusive access fairness operations according to some embodiments of the disclosure.

Referring to FIG. 12, FIG. 12 is a flow chart illustrating a method 1200 for enhanced exclusive read and write operations according to some embodiments of the disclosure. In some implementations, the method may be performed by the SoC of FIG. 7. For example, the request nodes, the NIUs, the interconnect, the HNs, and the memory devices may perform enhanced exclusive read and write operations.

The method 1200 includes, at block 1202, receiving, by a request node, a read data complete message including data associated with an exclusive read request for a particular memory address of a shared memory device and indicating the particular memory address has been read. For example, a request node may read data of a read data complete command, that is received responsive to the request node sending a read data command, as described with reference to FIGS. 7-11. To illustrate, the first request node 802, 902, 1002, 1102 (RN0) reads data for a first shared memory address at 820 of FIG. 8 or at 910 of FIG. 9 from a read data exclusive complete command responsive to a read data exclusive command, as described with reference to FIGS. 7-11. The read command may include or correspond to a RDE, a RE, a store, a store exclusive, or other similar read command.

At block 1204, the method 1200 includes arming, by the request node, an exclusive monitor based on the read data complete message. For example, the request node may arm a corresponding exclusive monitor at its corresponding NIU, as described with reference to FIGS. 7-9. To illustrate, the first request node 802, 902, 1002, 1102 (RN0) arms the first exclusive monitor at the first NIU 722 at 825 of FIG. 8, at 915 of FIG. 9, at 1010 of FIG. 10, or at 1110 of FIG. 11, responsive to receiving the read data exclusive complete command, as described with reference to FIGS. 7-11.

At block 1206, the method 1200 includes starting, by the request node, a timeout timer for the exclusive monitor responsive to arming the exclusive monitor. For example, the request node may start a timeout timer corresponding to the exclusive monitor is just armed at its corresponding NIU responsive to arming the exclusive monitor or the receiving the response to the read data command from the NH, as described with reference to FIGS. 7-9. To illustrate, the first request node 802, 902, 1002, 1102 (RN0) starts the first timeout timer at the first NIU 722 at 825 of FIG. 8, at 915 of FIG. 9, at 1010 of FIG. 10, or at 1110 of FIG. 11, by decrementing or incrementing the timeout register responsive to receiving the read data exclusive complete command, as described with reference to FIGS. 7-11.

At block 1208, the method 1200 includes sending, by the request node prior to expiration of the timeout timer, an exclusive write request for the particular memory address to a home node associated with the shared memory device, wherein success of the exclusive write request for the particular memory address is guaranteed based on the exclusive write request being sent prior to expiration of the timeout timer. For example, the request node may send an exclusive write request for the particular memory address to a home node associated with the shared memory device, as described with reference to FIGS. 7-11. To illustrate, the first request node 802, 902, 1002, 1102 (RN0) sends a write data exclusive command at 850 of FIG. 8, at 105 of FIG. 10, or at 1135 of FIG. 11 to the first home node 806, 906, 1006, 1106 (HN0) prior to the expiration of the first timeout timer (e.g., the first timeout register reaching zero), as described with reference to FIGS. 7-11.

Because the write data exclusive command is sent prior to the expiration of the first timeout timer, the success of the write data exclusive command is guaranteed by the device. The operations to guarantee the write data exclusive command may be implemented based on the operations described with reference to any of FIGS. 7-11. For example, the HN may store or queue other exclusive access commands during the timeout timer based on snoop operations and the timeout timer, the RN may delay sending snoop responses based on the timeout timer, the RN may transmit a snoop fail commands based on the timeout timer, etc. The above examples may be contrasted with the example of FIG. 9, in which the write data exclusive command is sent after expiration of the timeout timer at 965. In such scenarios, the write data exclusive command from the first request node 902 is in race with other concurrent/competing write data exclusive commands, and the write data exclusive command may succeed or fail based on the race. In the example of FIG. 9, the first request node 902 loses the race and the write data exclusive command is not successful. However, in other particular scenarios the write data exclusive command from the first request node 902 may succeed even after expiration of the timeout timer if it "wins" the race and has time priority over an exclusive access command from another request node.

In a first aspect, a device includes a processing system that includes: one or more shared memory devices, each shared memory device of the one or more shared memory devices includes a plurality of shared memory addresses; one or more request nodes, each request node corresponding to a processor of the processing system; one or more network interface units (NIUs), each NIU of the one or more NIUs including an exclusive monitor configured to monitor exclusive accesses to the plurality of shared memory addresses for a corresponding request node of the one or more request nodes and including a timeout register for the exclusive monitor configured to control exclusive access fairness; one or more home nodes, each home node of the one or more home nodes coupled to a corresponding shared memory device of the one or more shared memory devices; and an interconnect coupled to each NIU of the one or more NIUs and to each home node of the one or more home nodes and configured to couple the one or more request nodes to the one or more shared memory devices.

In a second aspect, alone or in combination with one or more of the above aspects, each request node of the one or more request nodes is coupled to a corresponding NIU of the of the one or more NIUs, wherein the one or more request nodes include one or more types of processors, and wherein the one or more types of processors include a central processing unit (CPU), a graphics processing unit (GPU), Image Processing Unit (ISP), Digital Signal Processor (DSP), a neural Processing Unit (NPU), a video encoder/decoder, a modem, or a combination thereof.

In a third aspect, alone or in combination with one or more of the above aspects, each home node of the one or more home nodes is configured to: manage snoop coherency operations to check a status of the timeout registers of the one or more NIUs; and place received exclusive data commands in a queue based on the status of the timeout registers.

In a fourth aspect, alone or in combination with one or more of the above aspects, the request node further comprising timeout register adjustment logic configured to adjust a duration of the timeout register responsive to an exclusive access success or an exclusive access failure.

In a fifth aspect, alone or in combination with one or more of the above aspects, the timeout register adjustment logic configured to: increase the duration of the timeout register by an offset value responsive to an exclusive access success; and decrease the duration of the timeout register by an offset value responsive to an exclusive access failure.

In a sixth aspect, alone or in combination with one or more of the above aspects, the timeout register adjustment logic further configured to: adjust the timeout register based on a maximum timeout value, a minimum time value, or combination thereof; and adjust a first timeout value of a first timeout register of a first NIU independent adjusting a second timeout value for a second timeout register of a second NIU.

In a seventh aspect, alone or in combination with one or more of the above aspects, each NIU is further configured to set the timeout register to a timeout value and decrement the timeout register responsive to receipt of an exclusive read data complete command.

In an eighth aspect, alone or in combination with one or more of the above aspects, each NIU is further configured to propagate/relay received exclusive write commands from a corresponding request node to an indicated home node based on the timeout register (e.g., a timeout value thereof, such as a base or adjusted timeout value).

In a ninth aspect, alone or in combination with one or more of the above aspects, a particular NIU of the one or more NIUs is further configured to. receive a snoop query message associated with an exclusive write data command for a particular shared memory address from another request node of the one or more request nodes, the other request node associated with a second particular NIU of the one or more NIUs; and send a snoop response message to the snoop query message and indicating a snoop fail based on a timeout register of an exclusive monitor for the particular shared memory address not being expired for a request node of the one or more request nodes associated with the particular NIU.

In a tenth aspect, alone or in combination with one or more of the above aspects, a particular NIU of the one or more NIUs is further configured to. receive a snoop query message associated with an exclusive write data command for a particular shared memory address from another request node of the one or more request nodes, the other request node associated with a second particular NIU of the one or more NIUs; delay sending a snoop response message to the snoop query message based on a timeout register of an exclusive monitor for the particular shared memory address not being expired for a request node of the one or more request nodes associated with the particular NIU; determine expiration of the timeout register of the exclusive monitor for the particular shared memory address for the request node; and send the snoop response message for the snoop query message based on a determination that the timeout register has expired.

In an eleventh aspect, alone or in combination with one or more of the above aspects, a first timeout register of a first NIU is set to a first timeout value different from a second timeout value for a second timeout register of a second NIU and is configured to be adjusted independent of the second timeout value for the second timeout register of the second NIU.

In a twelfth aspect, alone or in combination with one or more of the above aspects, the NIU includes a low pass filter configured to adjust (e.g., reduce) the adjustment value based on an adjustment counter or adjustment timer. For example, the low pass filter may be used to reduce the value or significance of the changes to the timeout timer starting value responsive an amount of timeout timer adjustments or an amount timeout timer adjustments with a particular time period.

In a thirteenth aspect, alone or in combination with one or more of the above aspects, the one or more NIUs do not include a fairness counter configured to track exclusive access fairness.

In a fourteenth aspect, alone or in combination with one or more of the above aspects, the one or more home nodes do not include a fairness counter configured to track exclusive access fairness.

In a fifteenth aspect, alone or in combination with one or more of the above aspects, the processing system is configured to cause the processing system to: receive, by a request node, a read data complete message including data associated with an exclusive read request for a particular memory address of a shared memory device and indicating the particular memory address has been read; arm, by the request node, an exclusive monitor based on the read data complete message; start, by the request node, a timeout timer for the exclusive monitor responsive to arming the exclusive monitor; and send, by the request node prior to expiration of the timeout timer, an exclusive write request for the particular memory address to a home node associated with the shared memory device, wherein success of the exclusive write request for the particular memory address is guaranteed based on the exclusive write request being sent prior to expiration of the timeout timer.

In a sixteenth aspect, alone or in combination with one or more of the above aspects, a method for exclusive access management comprising: receiving, by a request node, a read data complete message including data associated with an exclusive read request for a particular memory address of a shared memory device and indicating the particular memory address has been read; arming, by the request node, an exclusive monitor based on the read data complete message; starting, by the request node, a timeout timer for the exclusive monitor responsive to arming the exclusive monitor; and sending, by the request node prior to expiration of the timeout timer, an exclusive write request for the particular memory address to a home node associated with the shared memory device, wherein success of the exclusive write request for the particular memory address is guaranteed based on the exclusive write request being sent prior to expiration of the timeout timer.

In a seventeenth aspect, alone or in combination with one or more of the above aspects, the method further includes: receiving, by the home node from a second request node and during operation of the timeout timer, an exclusive data request (e.g., an exclusive read command or an exclusive write command) for the particular memory address of the shared memory device; detecting, by the home node, a hazard associated with the exclusive data request for the particular memory address from the second request node based on a directory entry corresponding to the exclusive read request for the particular memory address by the request node; and placing, by the home node, the exclusive data request for the particular memory address from the second request node into a queue based on the detection of the hazard.

In an eighteenth second aspect, alone or in combination with one or more of the above aspects, the method further includes: transmitting, by the home node, a write complete command indicating a write failure to the second request node for the exclusive data request for the particular memory address responsive to completion of the exclusive write request from the request node.

In a nineteenth aspect, alone or in combination with one or more of the above aspects, the home node is configured to discard the exclusive data request for the particular memory address of the shared memory device after expiration of the timeout timer if no write data exclusive command has been received from the request node.

In a twentieth aspect, alone or in combination with one or more of the above aspects, the method further includes: clearing the timeout timer and decreasing a starting value of the timeout timer based on completion of the exclusive write request from the request node.

In a twenty-first aspect, alone or in combination with one or more of the above aspects, the method further includes: starting the timeout timer based on receiving a second read data complete message; and increasing a starting value of the timeout timer based on a determination that the timeout timer has expired for the second read data complete message.

In a twenty-second aspect, alone or in combination with one or more of the above aspects, the method further includes: receiving, by the request node, a snoop query message for the particular memory address from the home node and associated with a second exclusive write request for the particular memory address by a second request node; determining, by the request node, that the exclusive monitor is armed for the particular memory address and that the timeout timer for the particular memory address has not expired responsive to the snoop query message from the home node; and sending, by the request node, a snoop query response message for the particular memory address to the home node indicating a snoop failure based on a determination that the timeout timer for the particular memory address has not expired.

In a twenty-third aspect, alone or in combination with one or more of the above aspects, the method further includes: receiving, by the request node, a snoop query message for the particular memory address from the home node and associated with a second exclusive write request for the particular memory address by a second request node; determining, by the request node, that the exclusive monitor is armed for the particular memory address and that the timeout timer for the particular memory address has not expired responsive to the snoop query message from the home node; delaying, by the request node, from sending a snoop query response message for the particular memory address to the home node and responsive to the snoop query message based on a determination that that the timeout timer for the particular memory address has not expired; and sending, by the request node after expiration of the timeout timer, the snoop query response message for the particular memory address to the home node indicating a hit based on a determination that the exclusive monitor is armed.

In a twenty-fourth aspect, alone or in combination with one or more of the above aspects, the method further includes: receiving, by the request node, a second read data complete message including second data associated with a second exclusive read request for the particular memory address of the shared memory device and indicating the particular memory address has been read; arming, by the request node, the exclusive monitor based on the second read data complete message; starting, by the request node, the timeout timer for the exclusive monitor responsive to arming the exclusive monitor based on the second read data complete message; and sending, by the request node after expiration of the timeout timer, a second exclusive write request for the particular memory address to the home node associated with the shared memory device, wherein success of the second exclusive write request for the particular memory address is not guaranteed based on the second exclusive write request being sent after expiration of the timeout timer.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-2 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to the figures included with this description may be combined with one or more blocks (or operations) described with reference to another of the figures. For example, one or more blocks (or operations) of FIG. 3 may be combined with one or more blocks (or operations) of FIG. 1 or FIG. 2.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and "back," or "top" and "bottom," or "forward" and "backward" are sometimes used for ease of describing the figures, and indicate relative positions corresponding to the orientation of the figure on a properly oriented page, and may not reflect the proper orientation of any device as implemented.

As used herein, the term "coupled to" in the various tenses of the verb "couple" may mean that element A is directly connected to element B or that other elements may be connected between elements A and B (i.e., that element A is indirectly connected with element B), to operate certain intended functions. In the case of electrical components, the term "coupled to" may also be used herein to mean that a wire, trace, or other electrically conductive material is used to electrically connect elements A and B (and any components electrically connected therebetween). In some examples, the term "coupled to" mean a transfer of electrical energy between elements A and B, to operate certain intended functions.

In some examples, the term "electrically connected" mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A device comprising:
    a processing system including:
        one or more shared memory devices, each shared memory device of the one or more shared memory devices includes a plurality of shared memory addresses;
        one or more request nodes, each request node corresponding to a processor of the processing system;
        one or more network interface units (NIUs), each NIU of the one or more NIUs including an exclusive monitor configured to monitor exclusive accesses to the plurality of shared memory addresses for a corresponding request node of the one or more request nodes and including a timeout register for the exclusive monitor configured to control exclusive access fairness;
        one or more home nodes, each home node of the one or more home nodes coupled to a corresponding shared memory device of the one or more shared memory devices; and
        an interconnect coupled to each NIU of the one or more NIUs and to each home node of the one or more home nodes and configured to couple the one or more request nodes to the one or more shared memory devices.

2. The device of claim 1, wherein each request node of the one or more request nodes is coupled to a corresponding NIU of the of the one or more NIUs, wherein the one or more request nodes include one or more types of processors, and wherein the one or more types of processors include a central processing unit (CPU), a graphics processing unit (GPU), Image Processing Unit (ISP), Digital Signal Processor (DSP), a neural Processing Unit (NPU), a video encoder/decoder, a modem, or a combination thereof.

3. The device of claim 1, each home node of the one or more home nodes is configured to:
    manage snoop coherency operations to check a status of the timeout registers of the one or more NIUs; and
    place received exclusive data commands in a queue based on the status of the timeout registers.

4. The device of claim 1, further comprising timeout register adjustment logic configured to adjust a duration of the timeout register responsive to an exclusive access success or an exclusive access failure.

5. The device of claim 4, the timeout register adjustment logic configured to:
    increase the duration of the timeout register by an offset value responsive to an exclusive access success; and
    decrease the duration of the timeout register by an offset value responsive to an exclusive access failure.

6. The device of claim 4, the timeout register adjustment logic further configured to:
    adjust the timeout register based on a maximum timeout value, a minimum time value, or combination thereof; and
    adjust a first timeout value of a first timeout register of a first NIU independent adjusting a second timeout value for a second timeout register of a second NIU.

7. The device of claim 1, wherein each NIU is further configured to set the timeout register to a timeout value and decrement the timeout register responsive to receipt of an exclusive read data complete command.

8. The device of claim 1, wherein each NIU is further configured to send received exclusive write commands from a corresponding request node to an indicated home node based on the timeout register.

9. The device of claim 1, wherein a particular NIU of the one or more NIUs is further configured to:
    receive a snoop query message associated with an exclusive write data command for a particular shared memory address from another request node of the one or more request nodes, the other request node associated with a second particular NIU of the one or more NIUs; and
    send a snoop response message to the snoop query message and indicating a snoop fail based on a particular timeout register of a particular exclusive monitor for the particular shared memory address not being expired for a particular request node of the one or more request nodes associated with the particular NIU.

10. The device of claim 1, wherein a particular NIU of the one or more NIUs is further configured to:
    receive a snoop query message associated with an exclusive write data command for a particular shared memory address from another request node of the one or more request nodes, the other request node associated with a second particular NIU of the one or more NIUs;

delay sending a snoop response message to the snoop query message based on a particular timeout register of a particular exclusive monitor for the particular shared memory address not being expired for a particular request node of the one or more request nodes associated with the particular NIU;

determine expiration of the particular timeout register of the particular exclusive monitor for the particular shared memory address for the request node; and send the snoop response message for the snoop query message based on a determination that the particular timeout register has expired.

11. The device of claim 1, wherein the processing system is configured to cause the processing system to:

receive, by a particular request node, a read data complete message including data associated with an exclusive read request for a particular memory address of a particular shared memory device and indicating the particular memory address has been read;

arm, by the particular request node, a particular exclusive monitor based on the read data complete message;

start, by the particular request node, a particular timeout timer for the particular exclusive monitor responsive to arming the particular exclusive monitor; and send, by the particular request node prior to expiration of the particular timeout timer, an exclusive write request for the particular memory address to a home node associated with the particular shared memory device, wherein success of the exclusive write request for the particular memory address is guaranteed based on the exclusive write request being sent prior to expiration of the particular timeout timer.

12. A method for exclusive access management comprising:

receiving, by a request node, a read data complete message including data associated with an exclusive read request for a particular memory address of a shared memory device and indicating the particular memory address has been read;

arming, by the request node, an exclusive monitor based on the read data complete message;

starting, by the request node, a timeout timer for the exclusive monitor responsive to arming the exclusive monitor; and sending, by the request node prior to expiration of the timeout timer, an exclusive write request for the particular memory address to a home node associated with the shared memory device, wherein success of the exclusive write request for the particular memory address is guaranteed based on the exclusive write request being sent prior to expiration of the timeout timer.

13. The method of claim 12, further comprising:

receiving, by the home node from a second request node and during operation of the timeout timer, an exclusive data request for the particular memory address of the shared memory device;

detecting, by the home node, a hazard associated with the exclusive data request for the particular memory address from the second request node based on a directory entry corresponding to the exclusive read request for the particular memory address by the request node; and placing, by the home node, the exclusive data request for the particular memory address from the second request node into a queue based on the detection of the hazard.

14. The method of claim 13, further comprising:

transmitting, by the home node, a write complete command indicating a write failure to the second request node for the exclusive data request for the particular memory address responsive to completion of the exclusive write request from the request node.

15. The method of claim 13, wherein the home node discards the exclusive data request for the particular memory address of the shared memory device after expiration of the timeout timer if no write data exclusive command has been received from the request node.

16. The method of claim 12, further comprising:

clearing the timeout timer and decreasing a starting value of the timeout timer based on completion of the exclusive write request from the request node.

17. The method of claim 12, further comprising:

starting the timeout timer based on receiving a second read data complete message; and increasing a starting value of the timeout timer based on a determination that the timeout timer has expired for the second read data complete message.

18. The method of claim 12, further comprising:

receiving, by the request node, a snoop query message for the particular memory address from the home node and associated with a second exclusive write request for the particular memory address by a second request node;

determining, by the request node, that the exclusive monitor is armed for the particular memory address and that the timeout timer for the particular memory address has not expired responsive to the snoop query message from the home node; and sending, by the request node, a snoop query response message for the particular memory address to the home node indicating a snoop failure based on a determination that the timeout timer for the particular memory address has not expired.

19. The method of claim 12, further comprising:

receiving, by the request node, a snoop query message for the particular memory address from the home node and associated with a second exclusive write request for the particular memory address by a second request node;

determining, by the request node, that the exclusive monitor is armed for the particular memory address and that the timeout timer for the particular memory address has not expired responsive to the snoop query message from the home node;

delaying, by the request node, from sending a snoop query response message for the particular memory address to the home node and responsive to the snoop query message based on a determination that that the timeout timer for the particular memory address has not expired; and sending, by the request node after expiration of the timeout timer, the snoop query response message for the particular memory address to the home node indicating a hit based on a determination that the exclusive monitor is armed.

20. The method of claim 12, further comprising:

receiving, by the request node, a second read data complete message including second data associated with a second exclusive read request for the particular memory address of the shared memory device and indicating the particular memory address has been read;

arming, by the request node, the exclusive monitor based on the second read data complete message;

starting, by the request node, the timeout timer for the exclusive monitor responsive to arming the exclusive monitor based on the second read data complete message; and sending, by the request node after expiration of the timeout timer, a second exclusive write request for the particular memory address to the home node associated with the shared memory device, wherein success of the second exclusive write request for the particular memory address is not guaranteed based on the second exclusive write request being sent after expiration of the timeout timer.

\* \* \* \* \*